(12) United States Patent
Ye et al.

(10) Patent No.: US 12,386,560 B2
(45) Date of Patent: Aug. 12, 2025

(54) OPERATION METHOD OF STORAGE DEVICE

(71) Applicant: Samsung Electronics Co., Ltd., Suwon-si (KR)

(72) Inventors: Sang Young Ye, Suwon-si (KR); Seonghoon Woo, Suwon-si (KR); Haejong Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/534,660

(22) Filed: Dec. 10, 2023

(65) Prior Publication Data

US 2024/0264772 A1 Aug. 8, 2024

(30) Foreign Application Priority Data

Feb. 8, 2023 (KR) .................. 10-2023-0016966

(51) Int. Cl.
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
CPC .... G06F 3/0659; G06F 3/0619; G06F 3/0679; G06F 3/061; G06F 3/0607; G06F 3/0658
USPC .................................................. 711/154, 100
See application file for complete search history.

(56) References Cited

U.S. PATENT DOCUMENTS

| | | | |
|---|---|---|---|
| 10,019,161 B2 | 7/2018 | Sharifie et al. | |
| 10,235,102 B2 | 3/2019 | Richter et al. | |
| 10,866,740 B2 | 12/2020 | Benisty et al. | |
| 10,970,235 B2 | 4/2021 | Hong et al. | |
| 11,467,769 B2 | 10/2022 | Benisty | |
| 2017/0123667 A1* | 5/2017 | Richter | G06F 3/061 |
| 2021/0367777 A1 | 11/2021 | Benisty et al. | |
| 2022/0027092 A1 | 1/2022 | Katagiri | |
| 2022/0179562 A1 | 6/2022 | Michael et al. | |
| 2023/0004329 A1* | 1/2023 | Benisty | G06F 3/061 |

FOREIGN PATENT DOCUMENTS

EP 4086746 A1 11/2022

* cited by examiner

*Primary Examiner* — Hosain T Alam
*Assistant Examiner* — Zubair Ahmed
(74) *Attorney, Agent, or Firm* — Muir Patent Law, PLLC

(57) ABSTRACT

An operation method of a storage device connected to a host may include fetching one or more first commands from a first submission queue of the host by performing a first command fetch operation, processing one or more remaining commands other than the last command of the one or more first commands when a last command among the one or more first is a first fused commands, fetching one or more second commands from a second submission queue of the host by performing a second command fetch operation, processing the one or more second commands, and fetching at least two third commands from the first submission queue of the host by performing a third command fetch operation. The at least two third commands may include the first fused command and a second fused command corresponding to the first fused command.

20 Claims, 22 Drawing Sheets

FIG. 13

|  | Head | Tail | Fl |
|---|---|---|---|
| SQ1 | HP1 | TP1 | v |
| SQ2 | HP2 | TP2 | – |
| SQ3 | HP3 | TP3 | – |

⋮

| SQn | HPn | TPn | – |

OPERATION METHOD OF STORAGE DEVICE

CROSS-REFERENCE TO RELATED APPLICATION(S)

This application claims priority under 35 U.S.C. § 119 to Korean Patent Application No. 10-2023-0016966 filed on Feb. 8, 2023, in the Korean Intellectual Property Office, the disclosure of which is incorporated by reference herein in its entirety.

BACKGROUND

Embodiments of the present disclosure described herein relate to a semiconductor memory, and more particularly, relate to an operation method of a storage device.

Semiconductor memories are classified as volatile memories, which lose data stored therein when a power is turned off, such as a static random access memory (SRAM) or a dynamic random access memory (DRAM) or nonvolatile memories, which retain data stored therein even when a power is turned off, such as a flash memory, a phase-change RAM (PRAM), a magnetic RAM (MRAM), a resistive RAM (RRAM), or a ferroelectric RAM (FRAM).

A flash memory-based storage device (e.g., a solid state drive (SSD)) is widely used as a high-capacity storage medium of a computing system. The SSD may be configured to communicate with a host based on various communication protocols and to perform various operations. As an example, according to the nonvolatile memory express (NVMe) standard, a fused operation that performs more complex operations may be supported. In this case, the fused operation may be performed through a combination of simple commands. However, while the SSD is operating, commands for the fused operation may not be continuously fetched, in this case, the fused operation may not be performed normally or may be delayed. Therefore, it is desired that even when the commands for the fused operation are not continuously fetched, the fused operation may be performed normally or may not be delayed.

SUMMARY

Embodiments of the present disclosure provide an operation method of a storage device having improved performance and reduced costs.

According to an embodiment, an operation method of a storage device connected to a host may include fetching one or more first commands from a first submission queue of the host by performing a first command fetch operation, processing one or more remaining commands other than the last command of the one or more first commands when a last command among the one or more first commands is a first fused command, fetching one or more second commands from a second submission queue of the host by performing a second command fetch operation, processing the one or more second commands, and fetching at least two third commands from the first submission queue of the host by performing a third command fetch operation. The at least two third commands may include the first fused command and a second fused command corresponding to the first fused command.

According to an embodiment, an operation method of a storage device connected to a host may include fetching N commands (N being a natural number) from a first submission queue of a host by performing a first command fetch operation, and fetching M commands (M being a natural number) from a second submission queue of the host by performing a second command fetch operation. The performing of the first command fetch operation includes, before the performing of the second command fetch operation: when a fused operation (FUSE) field of a last command among the N commands fetched from the first submission queue through the first command fetch operation includes a first value, selectively further fetching a next command from the first submission queue. The last command and the next command may be processed in an atomic unit.

According to an embodiment, an operation method of a storage device which is connected to a host may include performing a fused operation in response to a first fused command and a second fused command written in a first submission queue of the host. The performing of the fused operation may include fetching a plurality of first commands from the first submission queue, the plurality of first commands including the first fused command and not including the second fused command, processing one or more remaining commands other than the first fused command among the plurality of first commands, fetching a plurality of second commands from the first submission queue, the plurality of second commands including both the first fused command and the second fused command, and processing the plurality of second commands. The first and second fused commands may be processed in an atomic unit.

BRIEF DESCRIPTION OF THE FIGURES

The above and other objects and features of the present disclosure will become apparent by describing in detail embodiments thereof with reference to the accompanying drawings.

FIG. 13 is a diagram for describing an operation according to the flowchart of FIG. 12 according to example embodiments.

DETAILED DESCRIPTION

Below, embodiments of the present disclosure will be described in detail and clearly to such an extent that an ordinary one in the art easily carries out the present disclosure.

According to embodiments of the present disclosure, when the last command among commands fetched from a first submission queue of a host is a first fused command, a storage device may discard the first fused command and may then fetch first and second fused commands from the first submission queue continuously or simultaneously. Alternatively, when the last command among the commands fetched from the first submission queue of the host is the first fused command, the storage device may further fetch a second fused command from the first submission queue. Accordingly, because the first and second fused commands for the fused operation are fetched simultaneously, at a time, or continuously, the fused operation may be performed normally, and additional hardware such as a command scheduler and a command buffer are not required. Accordingly, a storage device having improved performance and reduced costs is provided.

Figure 1:
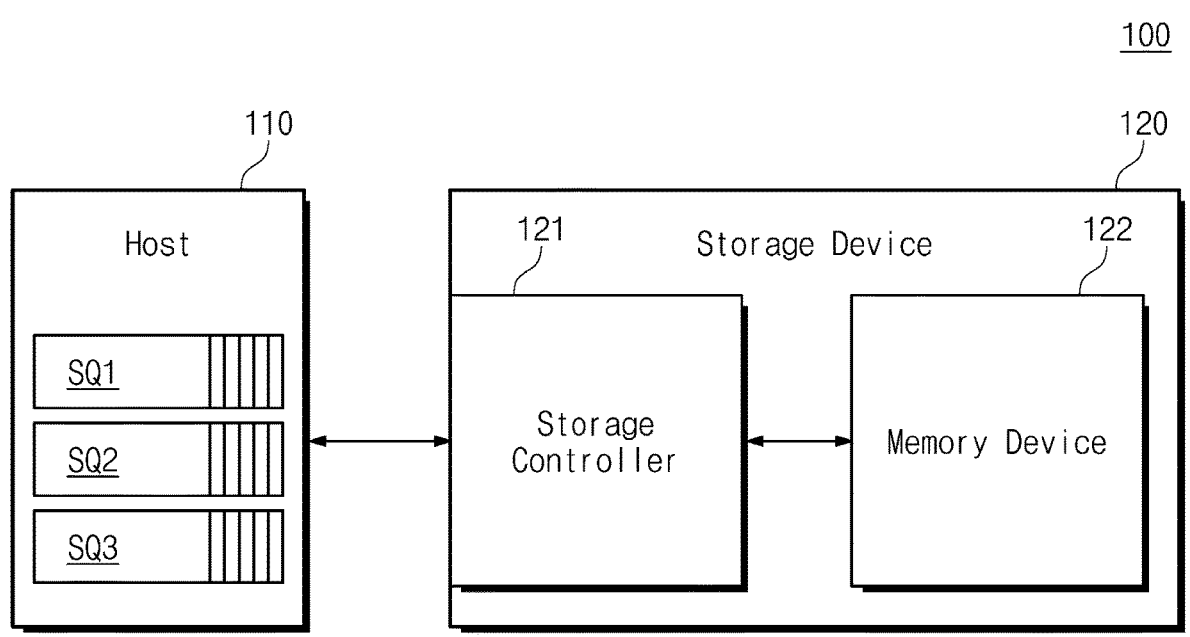
FIG. 1 is a block diagram illustrating a storage system according to an embodiment of the present disclosure.

FIG. 1 is a block diagram illustrating a storage system according to an embodiment of the present disclosure. Referring to FIG. 1, a storage system 100 may include a host 110 and a storage device 120. In an embodiment, the storage system 100 may be included in user devices such as a personal computer, a laptop computer, a server, a media player, and a digital camera or automotive devices such as a navigation system, a black box, and an automotive electronic device/part or may refer to a high-capacity storage medium included therein. Alternatively, the storage system 100 may be included in a mobile system such as a mobile phone, a smartphone, a tablet personal computer (PC), a wearable device, a health care device, or an Internet of things (IoT) device or may refer to a high-capacity storage medium included therein.

The host 110 may be configured to control the storage device 120. For example, the host 110 may store data in the storage device 120 or may read data stored in the storage device 120. The storage device 120 may operate under control of the host 110. For example, the storage device 120 may include a storage controller 121 and a memory device 122. Under control of the host 110, the storage controller 121 may store data in the memory device 122 or may transmit data stored in the memory device 122 to the host 110. In an embodiment, the memory device 122 may be a nonvolatile memory device such as a NAND flash memory, but the present disclosure is not limited thereto.

In an embodiment, the host 110 and the storage device 120 may communicate with each other based on a given interface or a given communication protocol. For example, the host 110 and the storage device 120 may communicate with each other based on the nonvolatile memory express (NVMe) interface. However, the present disclosure is not limited thereto. The host 110 and the storage device 120 may communicate with each other, based on at least one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, a CF (Compact Flash) card interface, and a CXL (Compute eXpress Link) interface.

Below, to describe embodiments of the present disclosure easily, it is assumed that the host 110 and the storage device 120 communicate with each other based on the NVMe interface. For example, the host 110 may include a plurality of submission queues SQ1, SQ2, and SQ3. The plurality of submission queues SQ1, SQ2, and SQ3 may be stored or managed in a host memory (not shown) included in the host 110. The host 110 may write a command for the storage device 120 in the plurality of submission queues SQ1, SQ2, and SQ3.

The storage device 120 may fetch the command written in the plurality of submission queues SQ1, SQ2, and SQ3 of the host 110 and may perform an operation (e.g., a data write operation, a data read operation, or various management operations) corresponding to the fetched command. The storage device 120 may provide the host 110 with a result of performing the corresponding operation.

In an embodiment, the given interface standard or communication protocol between the host 110 and the storage device 120 may support various operations. As an example, the NVMe interface standard may support the fused operation. The fused operation may support a more complicated operation by combining or fusing two simple commands. For example, the host 110 may perform the fused operation, in which compare and write are performed at a time, by using a compare command and a write command. In this case, the compare command and the write command for the fused operation of compare and write should be written continuously in the same submission queue (e.g., one of SQ1, SQ2, and SQ3). Also, the storage device 120 should process the compare command and the write command for the fused operation of compare and write continuously and in an atomic unit. That is, the storage device 120 should not process any other command or operation between the compare command and the write command for the fused operation of compare and write.

In an embodiment, whether the storage device 120 or the storage controller 121 supports the fused operation may be written in a fused operation support field of the identify controller data structure.

In an embodiment, it is assumed that the host 110 writes the compare command and the write command in the first submission queue SQ1 for the fused operation of compare and write. In this case, the storage device 120 may not recognize that the compare command and the write command for the fused operation are written in the first submission queue SQ1 until fetching the compare command and the write command from the first submission queue SQ1 and parsing the fetched commands. Because the storage device 120 fetches commands from each of the plurality of submission queues SQ1, SQ2, and SQ3 of the host 110 in compliance with various manners of arbitration policies, commands for the fused operation may not be fetched from the first submission queue SQ1 simultaneously, at a time, or continuously. In this case, the storage device 120 stores a command first fetched from among two commands for the fused operation in a separate buffer, and performs the fused operation after the other of the two commands for the fused operation is completely fetched. As such, for the storage device 120 to support the fused operation normally, because command scheduling is again performed and an additional buffer for temporarily storing a command is required, the complexity of the storage device 120 may increase.

According to embodiments of the present disclosure, the storage device 120 may determine whether the fetched command is a command for the fused operation, by checking specific fields of commands respectively fetched from the plurality of submission queues SQ1, SQ2, and SQ3. When the fetched command is a command for the fused operation, the storage device 120 may discard the fetched command or may additionally fetch a command from a relevant submission queue, and thus, an operation of fetching commands for the fused operation at a time, simultaneously, or continuously may be guaranteed. In this case, because a buffer for temporarily storing a command is not required and command scheduling for the fused operation is not required, the complexity of hardware of the storage device 120 may decrease. A structure and an operation of the storage device 120 according to an embodiment of the present disclosure will be described in detail with reference to the following drawings.

Below, for convenience of description, the terms "fused operation" and "fused command" are used. The fused operation may refer to a fused operation that is defined by the NVMe standard as an atomic operation performed through a combination of at least two simple commands. Here, the atomic operation may be an operation that will always be executed without any other process being able to read or change state that is read or changed during the operation. The fused command may refer to simple commands for one fused operation. For example, the compare command and the write command are required for the fused operation of compare and write. In this case, the compare command may be referred to as a "first fused command", and the write command may be referred to as a "second fused command". However, the present disclosure is not limited thereto.

Figure 2:
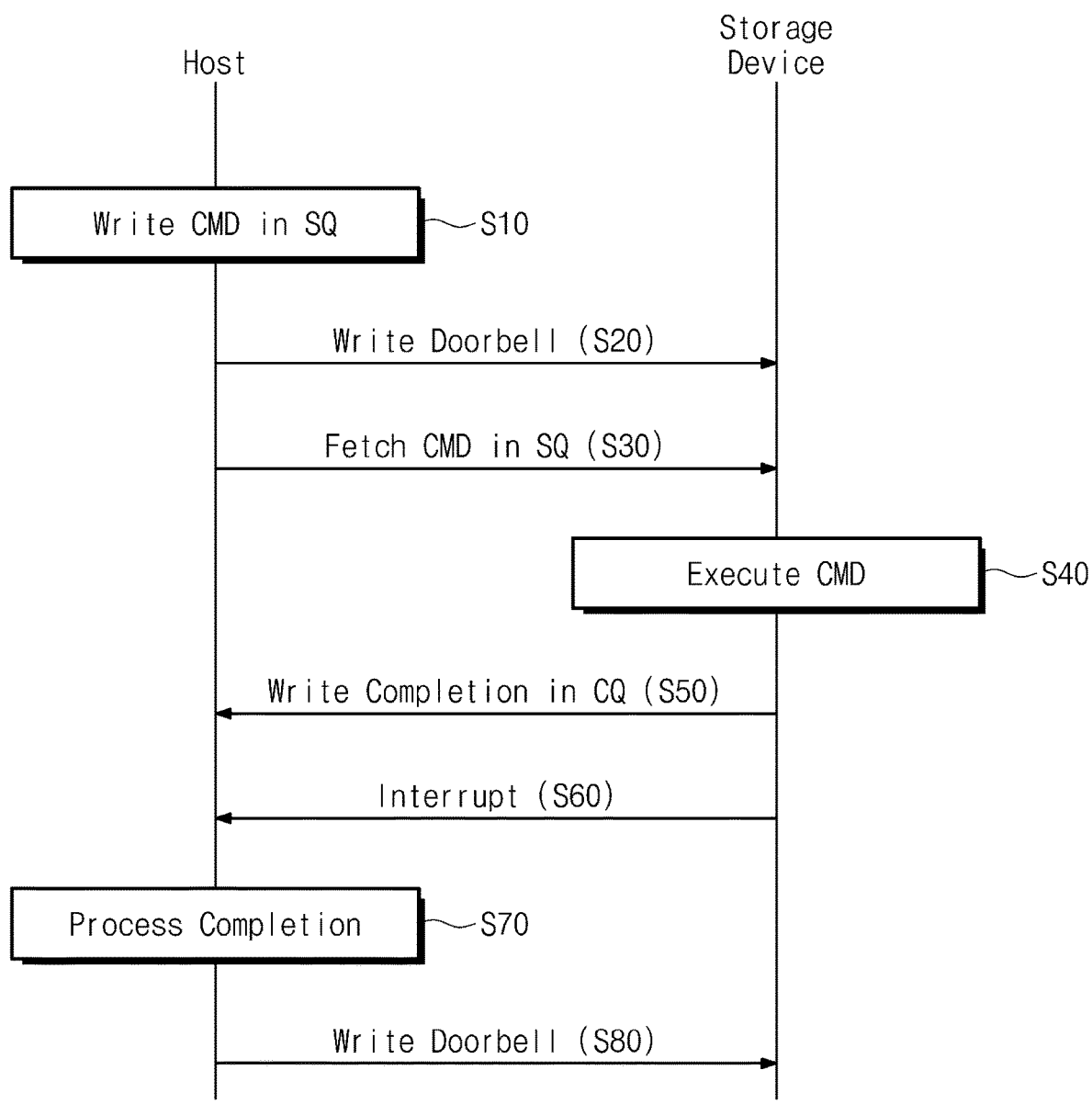
FIG. 2 is a flowchart illustrating an operation of a storage system of FIG. 1 according to example embodiments.

FIG. 2 is a flowchart illustrating an operation of a storage system of FIG. 1 according to example embodiments. In an embodiment, operations of the host 110 and the storage device 120 that communicate with each other based on the NVMe interface will be described with reference to FIG. 2. However, the present disclosure is not limited thereto.

Referring to FIGS. 1 and 2, in operation S10, the host 110 may write a command CMD in a submission queue SQ. For example, when the host 110 performs the write operation on the storage device 120, the host 110 may write the command CMD corresponding to the write operation in one of the plurality of submission queues SQ1, SQ2, and SQ3. In an embodiment, as described above, when the host 110 performs the fused operation, a plurality of commands for the fused operation may be written in the same submission queue.

In operation S20, the host 110 may write a doorbell in the storage device 120. For example, the host 110 may be configured to write the doorbell in a submission queue doorbell register for the purpose of providing the notification that the command CMD is written in the submission queue SQ. In an embodiment, through operation S20, a tail pointer corresponding to the submission queue SQ may be updated.

For example, the doorbell may include information about the number of commands written in the submission queue.

In operation S30, the storage device 120 may fetch the command CMD written in the submission queue SQ. For example, in response to that the doorbell register is updated, the storage device 120 may recognize that the command CMD is written in the submission queue SQ, and thus, the storage device 120 may fetch the command CMD from the submission queue SQ.

In operation S40, the storage device 120 may perform an operation corresponding to the fetched command CMD. For example, when the fetched command CMD corresponds to the write operation, the storage device 120 may perform the write operation.

In operation S50, the storage device 120 may write completion information in a completion queue CQ. For example, when the fetched command CMD corresponds to the write operation, the storage device 120 may perform the write operation. The storage device 120 may write the completion information about a result of the write operation in the completion queue CQ of the host 110.

In operation S60, the storage device 120 may transmit an interrupt to the host 110. For example, the storage device 120 may transmit the interrupt to the host 110 for the purpose of notifying the host 110 that the completion information corresponding to the fetched command CMD is written in the completion queue CQ.

In operation S70, the host 110 may process the completion information. For example, in response to the interrupt, the host 110 may recognize that the completion information is written in the completion queue CQ. The host 110 may check the processing result of the command CMD by processing the completion information written in the completion queue CQ.

In operation S80, the host 110 may write the doorbell in the storage device 120. For example, the host 110 may be configured to write the doorbell in a completion queue doorbell register for the purpose of providing notification that the completion information of the completion queue CQ is processed. In an embodiment, through operation S80, a head pointer corresponding to the completion queue CQ may be updated.

As described above, the host 110 and the storage device 120 may perform an operation based on the given interface. In an embodiment, the operation according to the flowchart of FIG. 2 is described based on the operation of processing one command, but the present disclosure is not limited thereto. For example, the host 110 may write a plurality of commands in the plurality of submission queues SQ1, SQ2, and SQ3, respectively. In this case, the storage device 120 may be configured to fetch and process one or more commands from each of the plurality of submission queues SQ1, SQ2, and SQ3.

Figure 3:
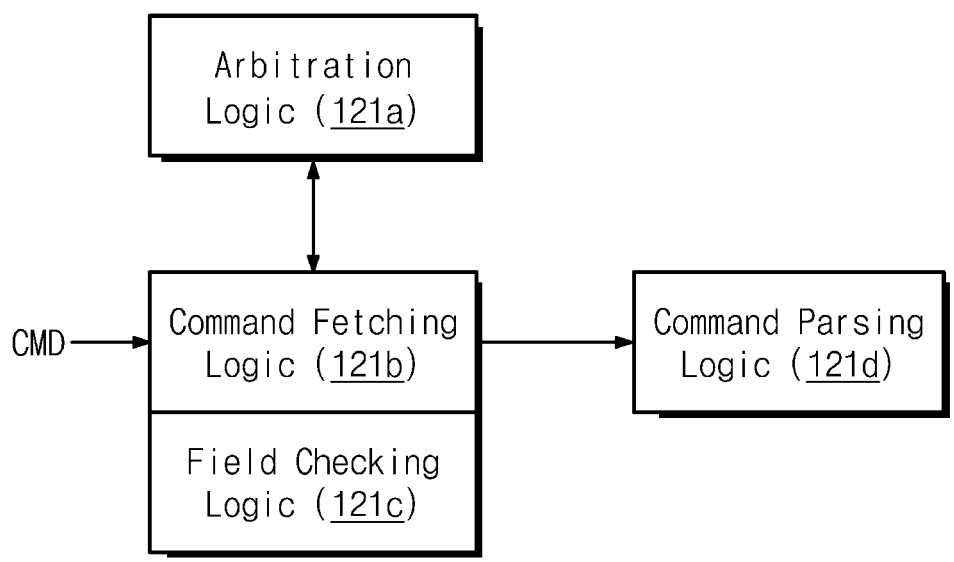
FIG. 3 is a block diagram illustrating some components of a storage controller of FIG. 1 according to example embodiments.

FIG. 3 is a block diagram illustrating some components of a storage controller of FIG. 1 according to example embodiments. Some components will be omitted to describe the technical features of the invention clearly. However, the present disclosure is not limited thereto. For example, the components illustrated in FIG. 3 may be components included in a host interface circuit of the storage controller 121. The storage controller 121 may further include any other components, such as a processor, a buffer memory, an ECC engine, and a flash interface, in addition to the components illustrated in FIG. 3.

Referring to FIGS. 1 to 3, the storage controller 121 may include arbitration logic 121a, command fetching logic 121b, field checking logic 121c, and command parsing logic 121d.

The arbitration logic 121a may be configured to perform an arbitration operation on a plurality of commands respectively written in the plurality of submission queues SQ1, SQ2, and SQ3. For example, based on at least one of various arbitration policies, the arbitration logic 121a may select one of the plurality of submission queues SQ1, SQ2, and SQ3 and may determine the number of commands to be fetched from the selected submission queue. In an embodiment, various arbitration policies may include a round-robin (RR) arbitration policy, a weighted round-robin (WRR) arbitration policy, or arbitration policies based on a specific arbitration algorithm. In an embodiment, the arbitration logic 121a may be configured to manage a tail pointer and a head pointer of each of the plurality of submission queues SQ1 to SQ3

The command fetching logic 121b may be configured to fetch one or more commands from the plurality of submission queues SQ1, SQ2, and SQ3 under control of the arbitration logic 121a. For example, when the first submission queue SQ1 is selected by the arbitration logic 121a and it is determined that the number of commands to be fetched is 2, the command fetching logic 121b may fetch two commands from the first submission queue SQ1 under control of the arbitration logic 121a.

The field checking logic 121c may be configured to check a specific field of the commands fetched by the command fetching logic 121b. For example, the field checking logic 121c may determine that each of the fetched commands correspond to a first fused command. The first fused command may refer to a first fused command corresponding to a portion of one fused operation from among fused commands. Whether the fetched command is a command for a portion of the fused operation may be written in a fused operation (FUSE) field of command Dword0 included in the fetched command.

For example, the field checking logic 121c may determine whether the fetched command is a command for the normal operation, the first fused command for the fused operation, or the second fused command for the fused operation, by checking the FUSE field of command Dword0 of the fetched command.

The command parsing logic 121d may receive at least one command from the command fetching logic 121b and may parse the received at least one command. For example, the command parsing logic 121d may parse various information or various fields included in the command and may transfer a result of the parsing to a next stage (e.g., a processor). In an embodiment, the processor may perform an operation corresponding to the command, based on the result parsed by the command parsing logic 121d.

In an embodiment, based on the check result of the command fetching logic 121b, the command fetching logic 121b may discard part of the fetched commands or may further fetch an additional command from one selected from the plurality of submission queues SQ1, SQ2, and SQ3 of the host 110.

For example, as described with reference to FIG. 1, operations corresponding to at least two fused commands should be continuously performed to normally perform the fused operation. To this end, the storage device 120 or the storage controller 121 may perform the fused operation after fetching all of at least two fused commands for the fused operation.

While the command fetching logic 121b fetches a command under control of the arbitration logic 121a, only part of at least two fused commands for one fused operation may be fetched. In detail, it is assumed that the first and second fused commands for the first fused operation are written in the first submission queue SQ1. According to the assumption, under control of the arbitration logic 121a, the command fetching logic 121b may fetch only the first fused command from the first submission queue SQ1 and may not fetch the second fused command. In this case, the field checking logic 121c may check the FUSE field of the fetched command to determine that the fetched command is the first fused command.

As such, the command fetching logic 121b may discard the fetched first fused command. The discarded first fused command is not transferred to the command parsing logic 121d. In this case, the command fetching logic 121b may fetch the first and second fused commands simultaneously or continuously in a next fetch operation for the first submission queue SQ1. Alternatively, the command fetching logic 121b may further fetch the second fused command from the first submission queue SQ1.

As described above, when the fetched command is part of the fused commands, the storage device 120 or the storage controller 121 may discard the fetched command or may perform an additional fetch operation for an additional command. In this case, because a plurality of fused commands for one fused operation are continuously fetched and processed, the complexity of hardware of the storage device 120 or the storage controller 121 may decrease.

Figure 4:
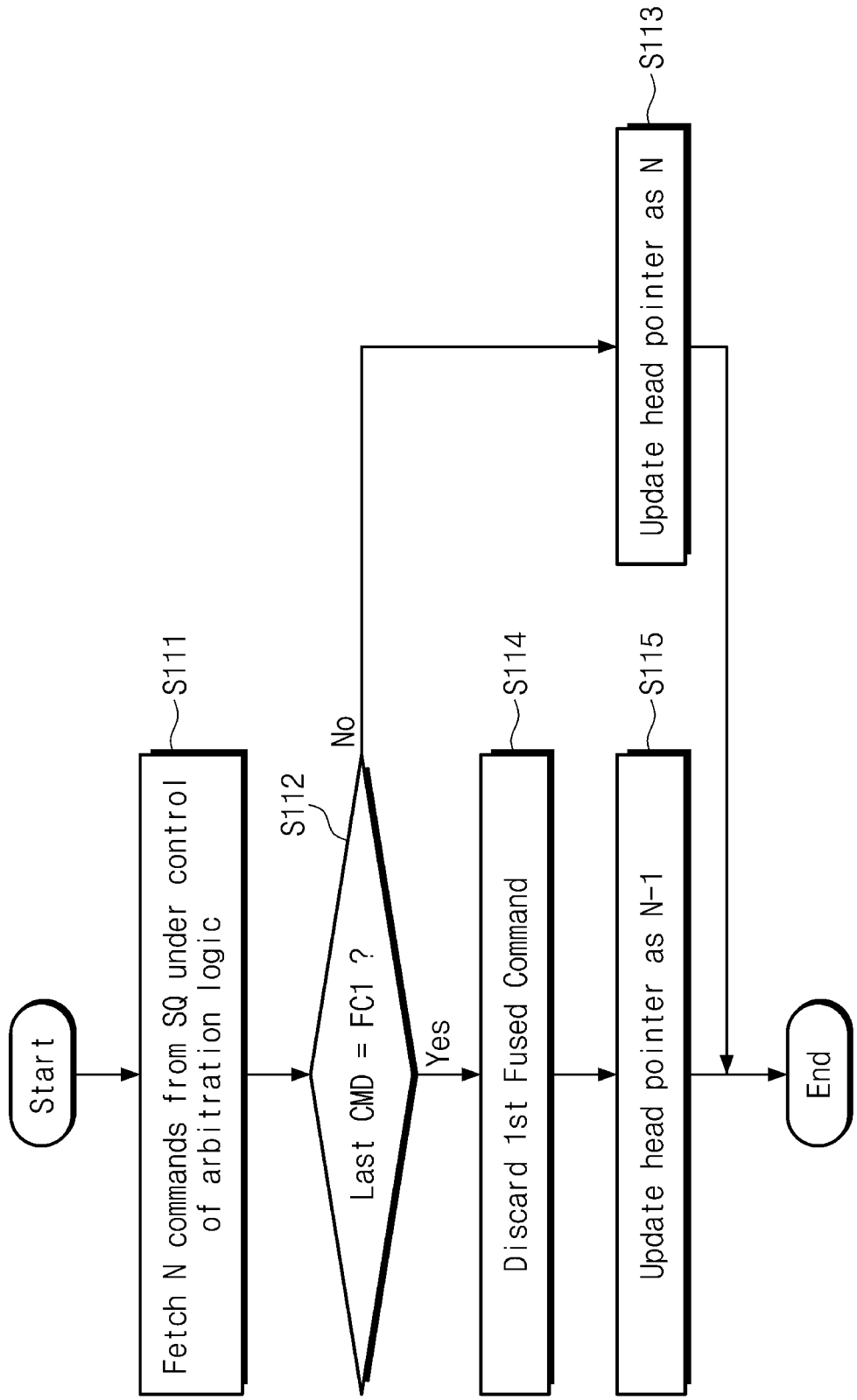
FIG. 4 is a flowchart illustrating an operation of a storage controller of FIG. 1 according to example embodiments.

FIG. 4 is a flowchart illustrating an operation of a storage controller of FIG. 1 according to example embodiments. In an embodiment, the flowchart of FIG. 4 shows the command fetch operation in operation S30 of FIG. 2. For example, the flowchart of FIG. 4 shows operations included in one command fetch operation. In other words, the expression "one command fetch operation" used in the specification may mean an operation of fetching N commands (N being a natural number) from one submission queue under control of the arbitration logic 121a. However, the present disclosure is not limited thereto.

Below, for convenience of description, it is assumed that the number of fused commands for one fused operation is 2. For example, a first fused command and a second fused command may be used for a first fused operation. However, the present disclosure is not limited thereto. For example, k fused commands (k being a natural number more than 2) may be used for one fused operation.

Referring to FIGS. 1 to 4, in operation S111, the storage controller 121 may fetch N commands (N being a natural number) from the submission queue SQ under control of the arbitration logic 121a. For example, as described with reference to FIG. 3, the arbitration logic 121a may select one submission queue among the plurality of submission queues SQ1 to SQ3 and may determine the number of commands to be fetched. The command fetching logic 121b may fetch the N commands from the selected submission queue SQ under control of the arbitration logic 121a.

In operation S112, the storage controller 121 may determine whether the last command among the N fetched commands is a first fused command FC1. For example, the field checking logic 121c may check the FUSE field of the last command among the N fetched commands to determine whether the fetched command is a command for the normal operation, the first fused command for the fused operation, or the second fused command for the fused operation.

In an embodiment, the last command among the N fetched commands may refer to a command fetched latest in terms of a time from among the N commands fetched in operation S111 (i.e., through one fetch operation). Alternatively, the last command among the N fetched commands may refer to a command written in the submission queue SQ latest in terms of a time from among the N commands fetched in operation S111 (i.e., through one fetch operation). Alternatively, the last command among the N fetched commands may refer to a command being the closest to the tail pointer in the submission queue SQ from among the N commands fetched in operation S111 (i.e., through one fetch operation). Alternatively, the last command among the N fetched commands may refer to a command being the most distant from the head pointer in the submission queue SQ from among the N commands fetched in operation S111 (i.e., through one fetch operation). However, the present disclosure is not limited thereto.

In an embodiment, that the last command is not the first fused command means that all the fused commands (e.g., the first and second fused commands) for the relevant fused operation are fetched or that there is no fused command for the fused operation.

In this case (i.e., when the last command is not the first fused command), in operation S113, the storage controller 121 may update the head pointer as much as the number of fetched commands (i.e., as much as "N"). For example, the arbitration logic 121a of the storage controller 121 may manage the tail pointer and the head pointer of each of the plurality of submission queues SQ1 to SQ3. The arbitration logic 121a may update the head pointer such that the head pointer of the selected submission queue (e.g., the first submission queue SQ1) moves (or increases) as much as "N".

In an embodiment, that the last command is the first fused command means that at least part (e.g., the second fused command) of the fused commands (e.g., the first and second fused commands) of the relevant fused operation is not yet fetched. Alternatively, that the last command is the first fused command means that only part of the fused commands (e.g., the first and second fused commands) of the relevant fused operation is fetched.

In this case (i.e., when the last command is the first fused command), in operation S114, the storage controller 121 may discard the last command, that is, the first fused command. In this case, only the remaining (N−1) commands other than the last command (i.e., the first fused command) among the N fetched commands may be provided to the command parsing logic 121d. In operation S115, the storage controller 121 may update the head pointer as much as (N−1). For example, the command fetching logic 121b may fetch the N commands under control of the arbitration logic 121a. Afterwards, when the last command is the first fused command, the command fetching logic 121b discards the last command. In this case, (N−1) commands may be processed by the command parsing logic 121d. That is, because the number of actually processed commands is (N−1), the arbitration logic 121a may update the head pointer such that the head pointer of the selected submission queue (e.g., the first submission queue SQ1) moves (or increases) as much as (N−1). In an embodiment, afterwards, the discarded last command may again be fetched when a command(s) is fetched from the first submission queue SQ1.

FIGS. 5A to 5F are diagrams for describing an operation of the flowchart of FIG. 4 according to example embodiments. Referring to FIGS. 1, 4, and 5A to 5F, the first submission queue SQ1 of the host 110 may include first to fourth commands CMD1, CMD2, CMD3, and CMD4, and the second submission queue SQ2 may include fifth to eighth commands CMD5, CMD6, CMD7, and CMD8. In this case, the second command CMD2 and the third command CMD3 may be the first fused command FC1 and a second fused command FC2, respectively. The arbitration logic 121a of the storage controller 121 of the storage device 120 may determine a submission queue and the number of commands to be fetched, based on pointer information PTI. For example, the pointer information PTI may include information about a first head pointer HP1 and a first tail pointer TP1 of the first submission queue SQ1 and a second head pointer HP2 and a second tail pointer TP2 of the second submission queue SQ2. In an embodiment, the tail pointers TP1 and TP2 may be updated through doorbell write of the host 110, and the head pointers HP1 and HP2 may be updated by an operation of the command fetching logic 121b.

The command fetching logic 121b may fetch commands from the first and second submission queues SQ1 and SQ2 under control of the arbitration logic 121a. The field checking logic 121c may check a specific field (e.g., the FUSE field) of the last command among the fetched commands. The command parsing logic 121d may parse and process the command received from the command fetching logic 121b.

Below, the command fetch operation of the storage controller 121 according to an embodiment of the present disclosure will be described in sequence. Below, to describe embodiments of the present disclosure easily, it is assumed that the arbitration logic 121a fetches two commands through one fetch operation for each of the first and second submission queues SQ1 and SQ2. However, the present disclosure is not limited thereto.

Figure 5A:
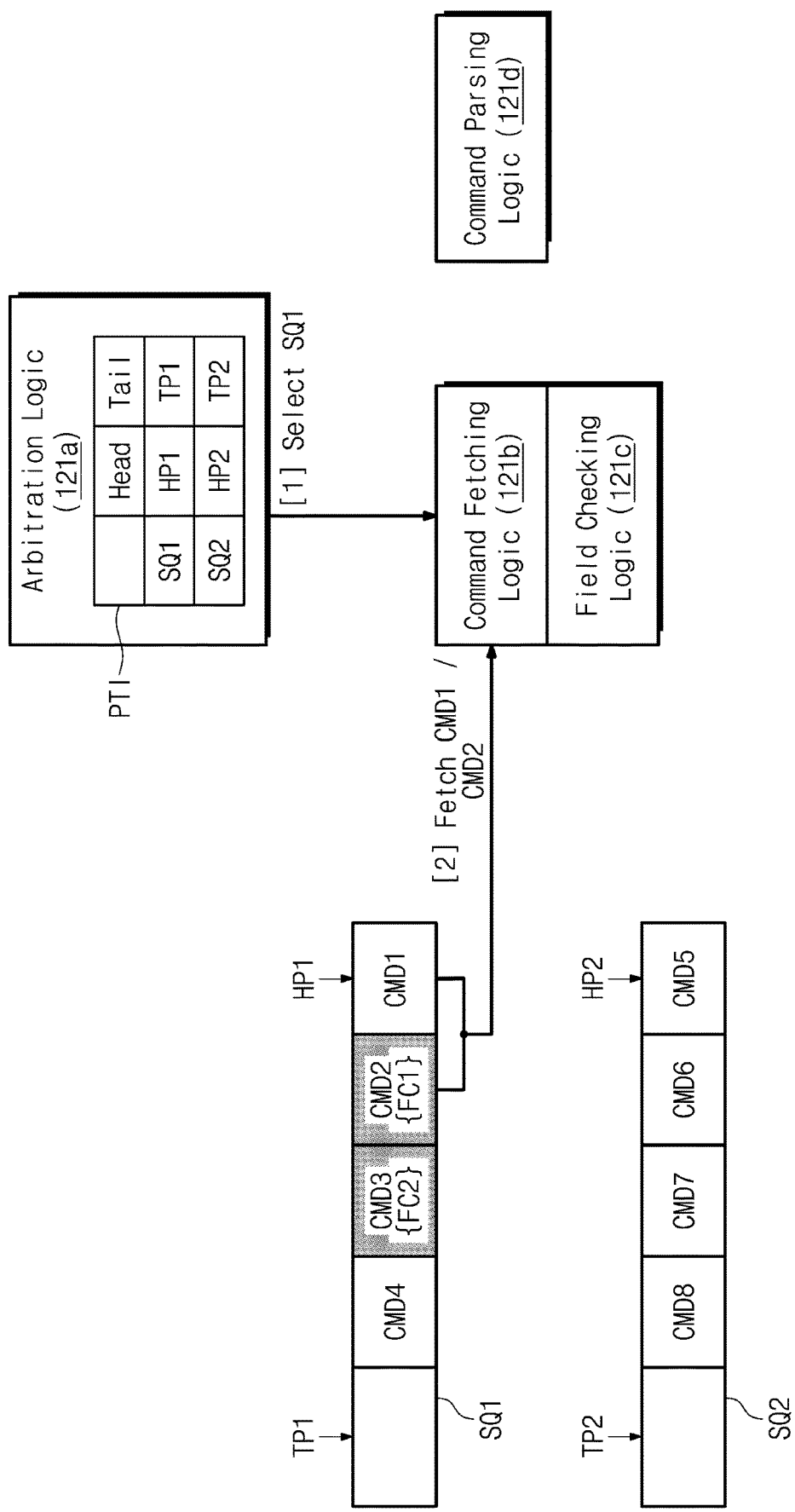
FIGS. 5A to 5F are diagrams for describing an operation of the flowchart of FIG. 4 according to example embodiments.

First, as illustrated in FIG. 5A, the arbitration logic 121a may select the first submission queue SQ1 (operation [1] of FIG. 5A). In an embodiment, the arbitration logic 121a may select one of the plurality of submission queues SQ1 and SQ2, based on the round robin, the weighted round robin, or a policy based on various arbitrations.

Under control of the arbitration logic 121a, the command fetching logic 121b may fetch two commands (i.e., first and second commands CMD1 and CMD2) from the first submission queue SQ1 (operation [2] of FIG. 5A). For example, the first head pointer HP1 of the first submission queue SQ1 may point out a position (or a slot) corresponding to the first command CMD1. In this case, the command fetching logic 121b may fetch two commands (i.e., CMD1 and CMD2) from the first command CMD1 pointed out by the first head pointer HP1. In an embodiment, the first and second commands CMD1 and CMD2 may be fetched through one fetch operation as defined in the specification.

Figure 5B:
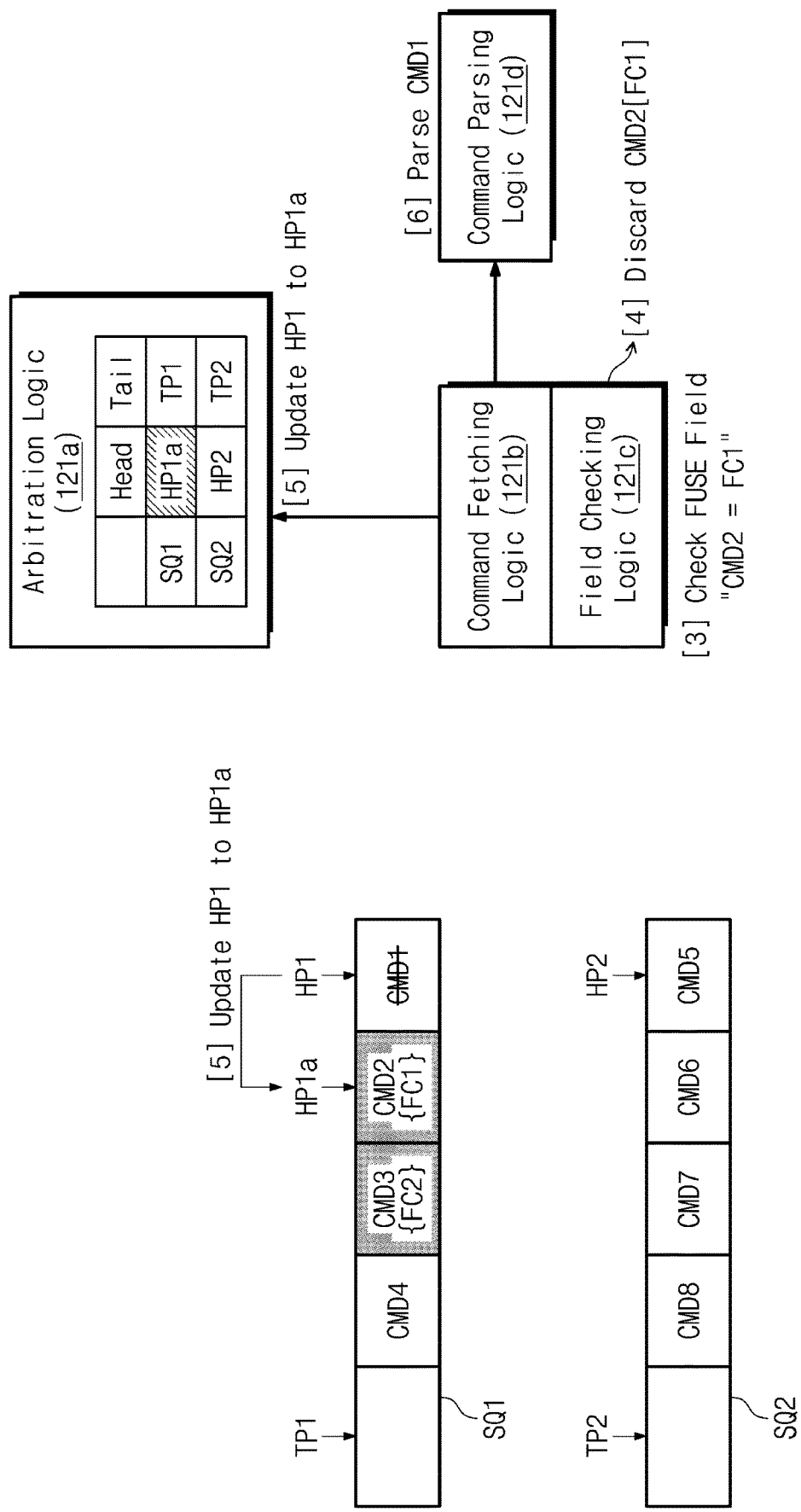

Next, as illustrated in FIG. 5B, the field checking logic 121c may check a specific field of the second command CMD2 (operation [3] of FIG. 5B). The last command among the first and second commands CMD1 and CMD2 fetched from the first submission queue SQ1 may be the second command CMD2. The field checking logic 121c may determine whether the second command CMD2 is the first fused command FC1, by checking the specific field (e.g., FUSE field) of the second command CMD2.

In the embodiment of FIG. 5B, the second command CMD2 may be the first fused command FC1. For example, in the embodiment of FIG. 5B, there is a state where all the first and second fused commands FC1 and FC2 for one fused operation are not fetched. In this case, the command fetching logic 121b may discard the first fused command FC1 (operation [4] of FIG. 5B).

Afterwards, the command fetching logic 121b may update the pointer information PTI of the arbitration logic 121a such that the head pointer of the first submission queue SQ1 is changed from HP1 to HP1a (operation [5] of FIG. 5B). For example, the command fetching logic 121b may fetch the first and second commands CMD1 and CMD2 from the first submission queue SQ1, however, the second command CMD2 may be discarded through the specific field check operation of the field checking logic 121c. In this case, only the first command CMD1 may be provided to the command parsing logic 121d. Because the second command CMD2 is not yet processed, a next fetch operation for the first submission queue SQ1 should start from the second command CMD2. Accordingly, the command fetching logic 121b may change the head pointer from HP1 to HP1a such that the head pointer of the first submission queue SQ1 points out the second command CMD2.

In other words, the command fetching logic 121b may fetch two commands from the first submission queue SQ1 and may discard one command (i.e., the first fused command). For this reason, the command fetching logic 121b may update the pointer information PTI such that the head pointer of the first submission queue SQ1 moves (or increases) as much as "1", that is, (2−1).

Afterwards, the command fetching logic 121b may provide the first command CMD1 to the command parsing logic 121d. The command parsing logic 121d may parse the first command CMD1 (operation [6] of FIG. 5B) to perform a next operation (or to perform an operation corresponding to the first command CMD1).

Figure 5C:
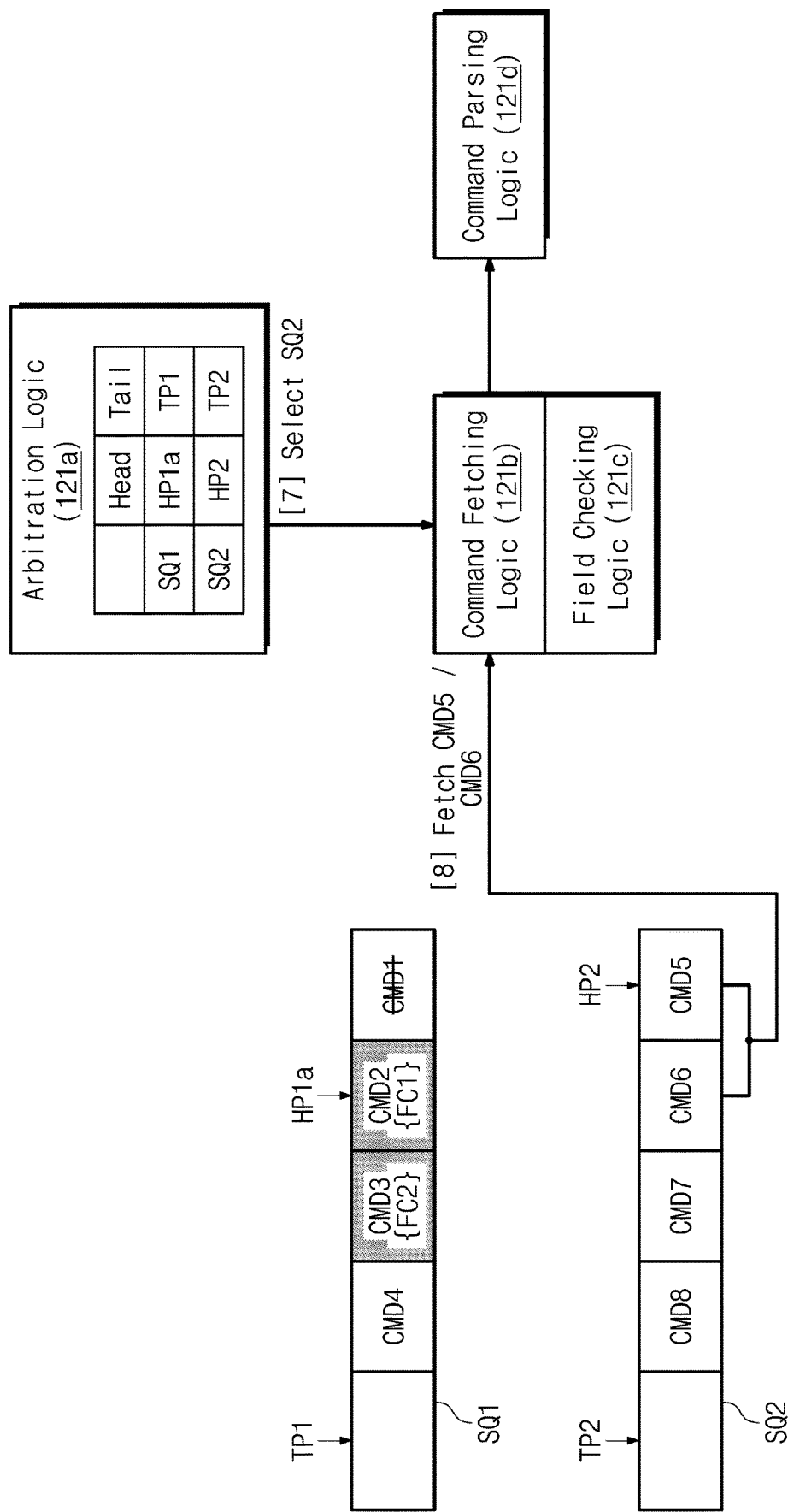

Next, as illustrated in FIG. 5C, the arbitration logic 121a may select the second submission queue SQ2 (operation [7] of FIG. 5C). The command fetching logic 121b may fetch the fifth and sixth commands CMD5 and CMD6 from the second submission queue SQ2 (operation [8] of FIG. 5C). For example, the second head pointer HP2 of the second submission queue SQ2 may point out a position (or a slot) corresponding to the fifth command CMD5. In this case, the command fetching logic 121b may fetch two commands (i.e., CMD5 and CMD6) from the fifth command CMD5 pointed out by the second head pointer HP2. In some embodiments, the command fetching logic 121b may fetch the number of commands different from two commands from the second submission queue SQ2.

In some embodiments, the operation [6] and the next operation of the operation [6] corresponding to the first command CMD1, and the operations [7] and [8] may be performed in parallel.

Figure 5D:
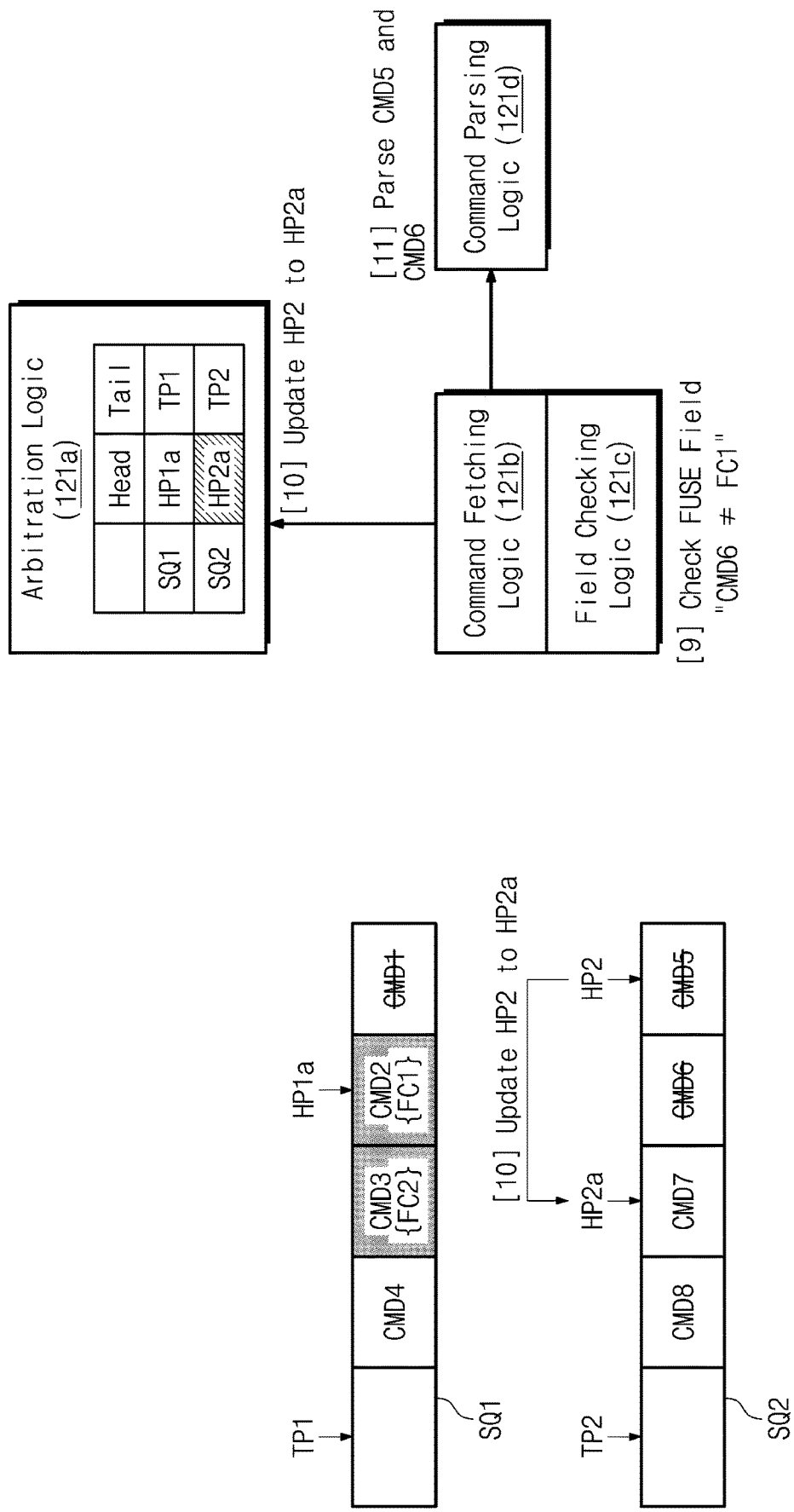

Next, as illustrated in FIG. 5D, the field checking logic 121c may check a specific field of the sixth command CMD6 (operation [9] of FIG. 5D). For example, the last command among the fifth and sixth commands CMD5 and CMD6 fetched from the second submission queue SQ2 may be the sixth command CMD6. The field checking logic 121c may determine whether the sixth command CMD6 is the first fused command FC1, by checking the specific field (e.g., FUSE field) of the sixth command CMD6.

In the embodiment of FIG. 5D, the sixth command CMD6 may not be the first fused command FC1. In this case, the command fetching logic 121b may update the head pointer of the second submission queue SQ2 so as to be changed from HP2 to HP2a (operation of FIG. 5D). For example, because two commands CMD5 and CMD6 are fetched from the second submission queue SQ2 by the command fetching logic 121b and the two commands are processed by the command parsing logic 121d, the head pointer of the second submission queue SQ2 may be updated to move (or increase) as much as "2" (i.e., may be changed from HP2 to HP2a).

The command fetching logic 121b may provide the fifth and sixth commands CMD5 and CMD6 to the command parsing logic 121d. The command parsing logic 121d may parse the fifth and sixth commands CMD5 and CMD6 (operation of FIG. 5D) to perform a next operation corresponding to the fifth and sixth commands CMD5 and CMD6.

Figure 5E:
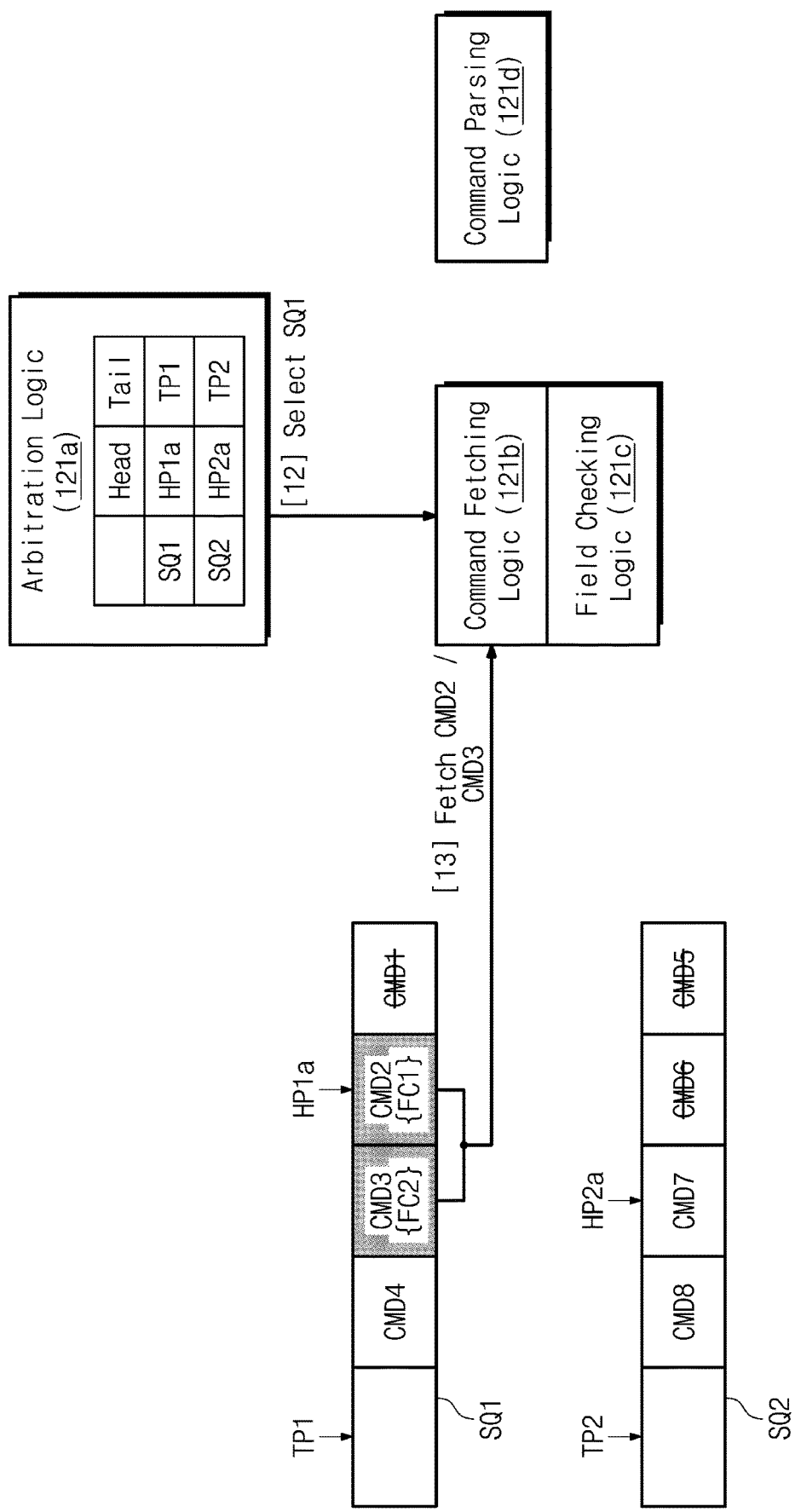

Next, as illustrated in FIG. 5E, the arbitration logic 121a may select the first submission queue SQ1 (operation of FIG. 5E). The command fetching logic 121b may fetch the second and third commands CMD2 and CMD3 from the first submission queue SQ1 under control of the arbitration logic 121a (operation of FIG. 5E). For example, the second command CMD2 may be the command fetched in operation [2] of FIG. 5A but may be the command discarded in operation [3] and operation [4] of FIG. 5B. Accordingly, in operation of FIG. 5E, the second command CMD2 may again be fetched. In this case, the second command CMD2 may be fetched together with the third command CMD3. In some embodiments, the operation and the next operation of the operation corresponding to the fifth and sixth commands CMD5 and CMD6, and the operations and may be performed in parallel.

Figure 5F:
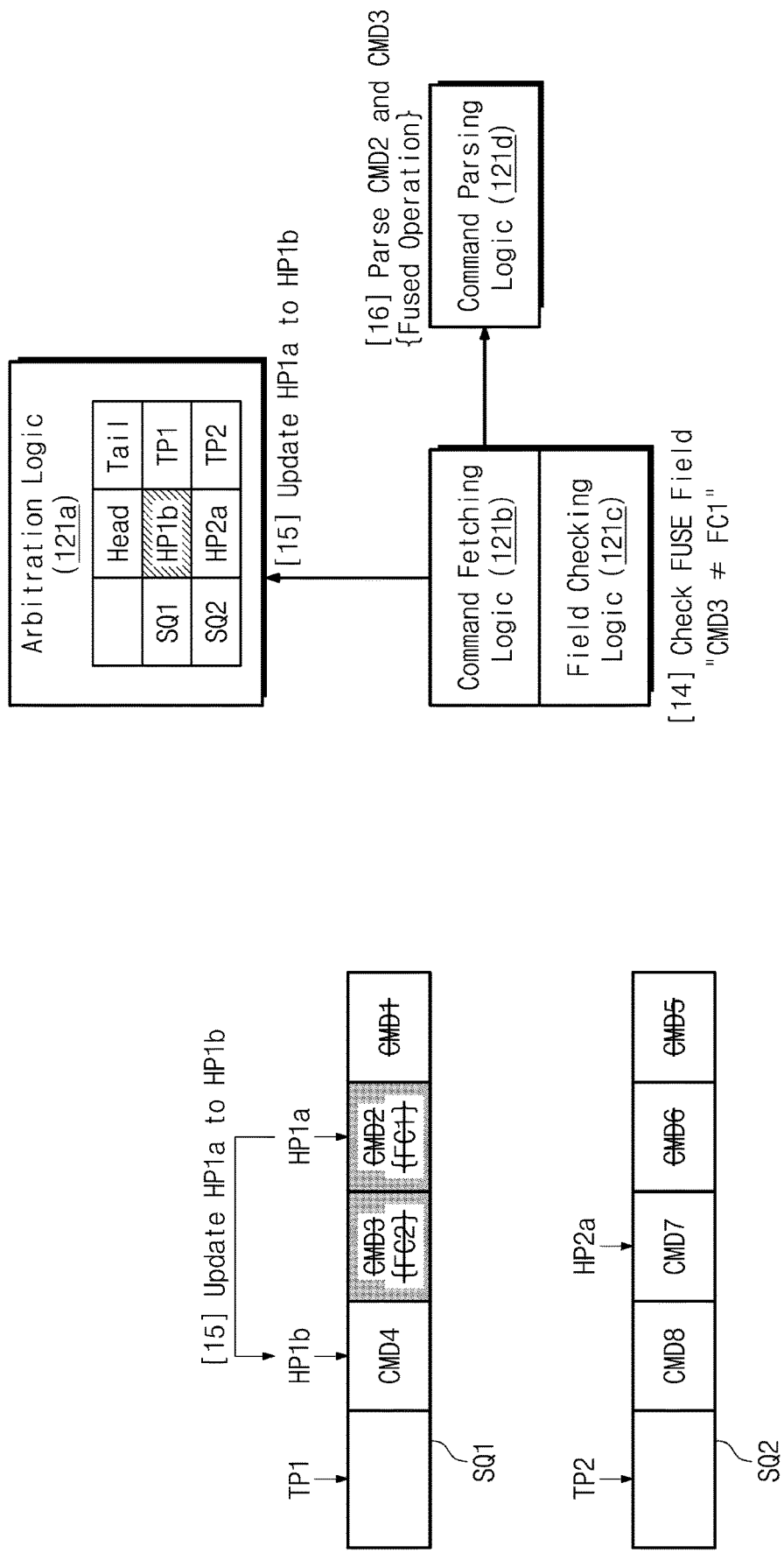

Next, as illustrated in FIG. 5F, the field checking logic 121c may check a specific field of the third command CMD3 (operation of FIG. 5F). The last command among the second and third commands CMD2 and CMD3 fetched from the first submission queue SQ1 may be the third command CMD3. The field checking logic 121c may determine whether the third command CMD3 is the first fused command FC1, by checking the specific field (e.g., FUSE field) of the third command CMD3.

In the embodiment of FIG. 5F, the third command CMD3 may not be the first fused command FC1. In this case, the command fetching logic 121b may update the head pointer of the first submission queue SQ1 so as to be changed from HP1a to HP1b (operation of FIG. 5F). In an embodiment, the third command CMD3 being the last command among the fetched commands CMD2 and CMD3 may be the second fused command FC2. In this case, because all the first and second fused commands FC1 and FC2 for the fused operation are fetched, the command fetching logic 121b may provide all the second and third commands CMD2 and CMD3 to the command parsing logic 121d. Accordingly, afterwards, because the fourth command CMD4 should be fetched from the first submission queue SQ1, the head pointer of the first submission queue SQ1 may be updated to be changed from HP1a to HP1b. Herein, HP1b may point out a position (or a slot) of the fourth command CMD4.

Afterwards, the command parsing logic 121d may parse and process the second and third commands CMD2 and CMD3 In an embodiment, because the second and third commands CMD2 and CMD3 are the first and second fused commands FC1 and FC2 for one fused operation, the storage controller 121 may perform the fused operation by continuously processing operations corresponding to the second and third commands CMD2 and CMD3.

As described above, according to an embodiment of the present disclosure, when commands fetched from a submission queue of the host 110 through one fetch operation include part of fused commands (i.e., when there is a fused command not yet fetched), the storage device 120 or the storage controller 121 may discard the part of the fused commands and may process the remaining fetched command(s) other than the discarded command. Afterwards, the storage device 120 or the storage controller 121 may fetch commands including the discarded command (i.e., the part of the fused commands) and the remaining fused command (s). Accordingly, because fused commands for the fused operation are fetched through one fetch operation or continuously, the hardware structure of the storage device 120 or the storage controller 121 for the fused operation may become simpler, and thus, the performance of the storage device 120 or the storage controller 121 may be improved.

Figure 6:
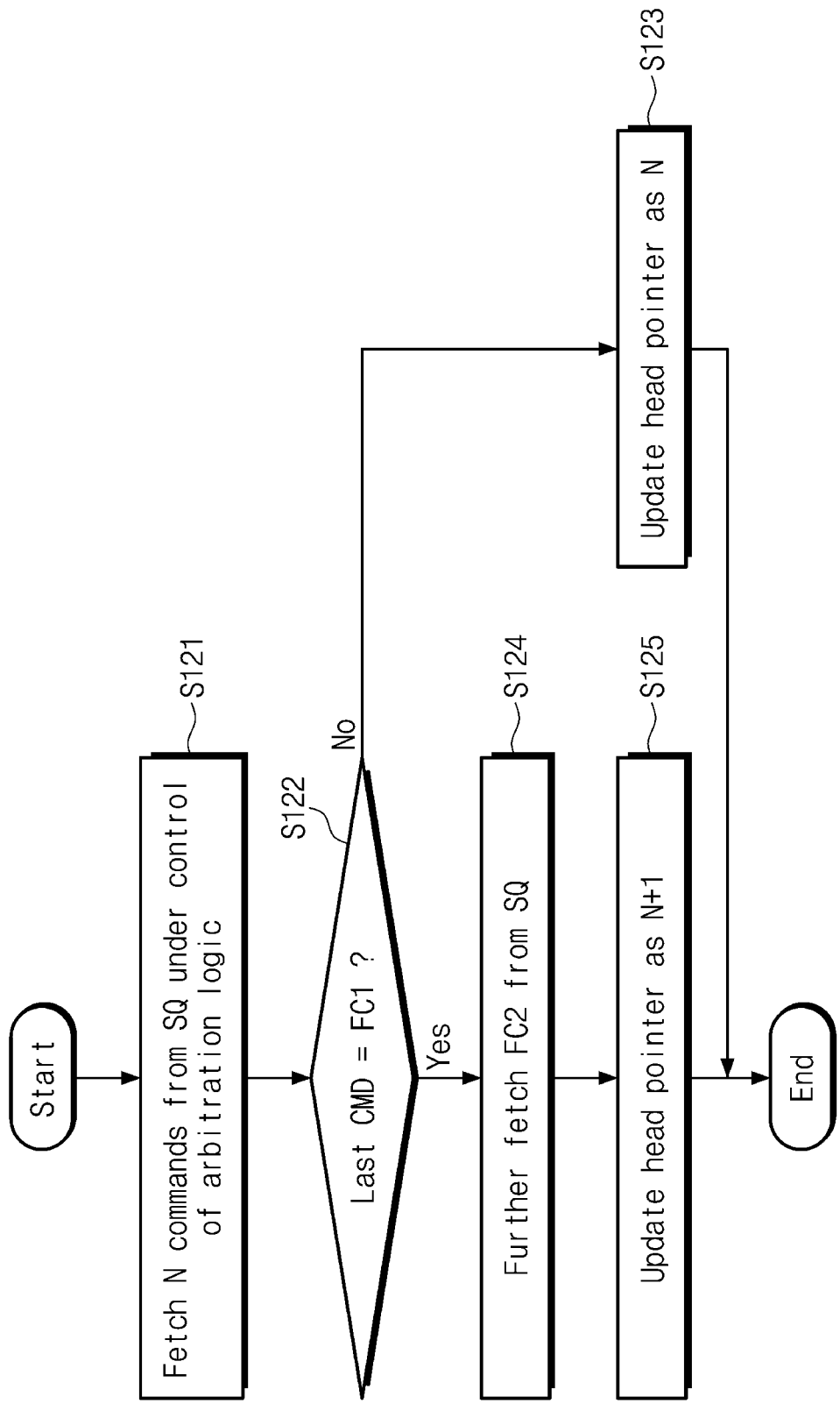
FIG. 6 is a flowchart illustrating an operation of a storage controller of FIG. 1 according to example embodiments.

FIG. 6 is a flowchart illustrating an operation of a storage controller of FIG. 1 according to example embodiments. In an embodiment, the flowchart of FIG. 6 shows the command fetch operation in operation S30 of FIG. 2. For example, the flowchart of FIG. 4 shows operations included in one command fetch operation. In other words, the expression "one command fetch operation" used in the specification may mean an operation of fetching N commands (N being a natural number) from one submission queue under control of the arbitration logic 121a. However, the present disclosure is not limited thereto.

Referring to FIGS. 1 to 3 and 6, in operation S121, the storage controller 121 may fetch N commands from the submission queue SQ under control of the arbitration logic 121a. In operation S122, the storage controller 121 may determine whether the last commands is the first fused command FC1. When the last command is not the first fused command FC1, in operation S123, the storage controller 121 updates the head pointer so as to increase as much as "N". In an embodiment, operation S121, operation S122, and operation S123 of FIG. 6 are similar to operation S111, operation S112, and operation S113 of FIG. 3, and thus, additional description will be omitted to avoid redundancy.

When the last command is the first fused command FC1, in operation S124, the storage controller 121 further fetch the second fused command FC2 from the submission queue SQ. For example, the first and second fused commands FC1 and FC2 for the fused operation may be written in the first submission queue SQ1. In this case, because only the first fused command FC1 is capable of being fetched through one fetch operation, the storage controller 121 may further fetch the second fused command FC2 from the first submission queue SQ1. As such, because all the first and second fused commands FC1 and FC2 are fetched by the command fetching logic 121b, the first and second fused commands FC1 and FC2 may be continuously processed (i.e., the fused operation being normally performed).

In operation S125, the storage controller 121 may update the head pointer so as to increase as much as (N+1). For example, through operation S121, the storage controller 121 may fetch N commands from the submission queue SQ. Afterwards, when the last command is the first fused command FC1, the storage controller 121 may further fetch the second fused command FC2 from the submission queue SQ. For example, the storage controller 121 may fetch a total of (N+1) commands from the submission queue SQ and may process (N+1) commands. In this case, the storage controller 121 may update the head pointer such that the head pointer corresponding to the submission queue SQ moves (or increases) as much as (N+1). In an embodiment, afterwards, a next fetch operation for the submission queue SQ may start from a command following the additionally fetched command (i.e., the second fused command FC2).

Figure 7:
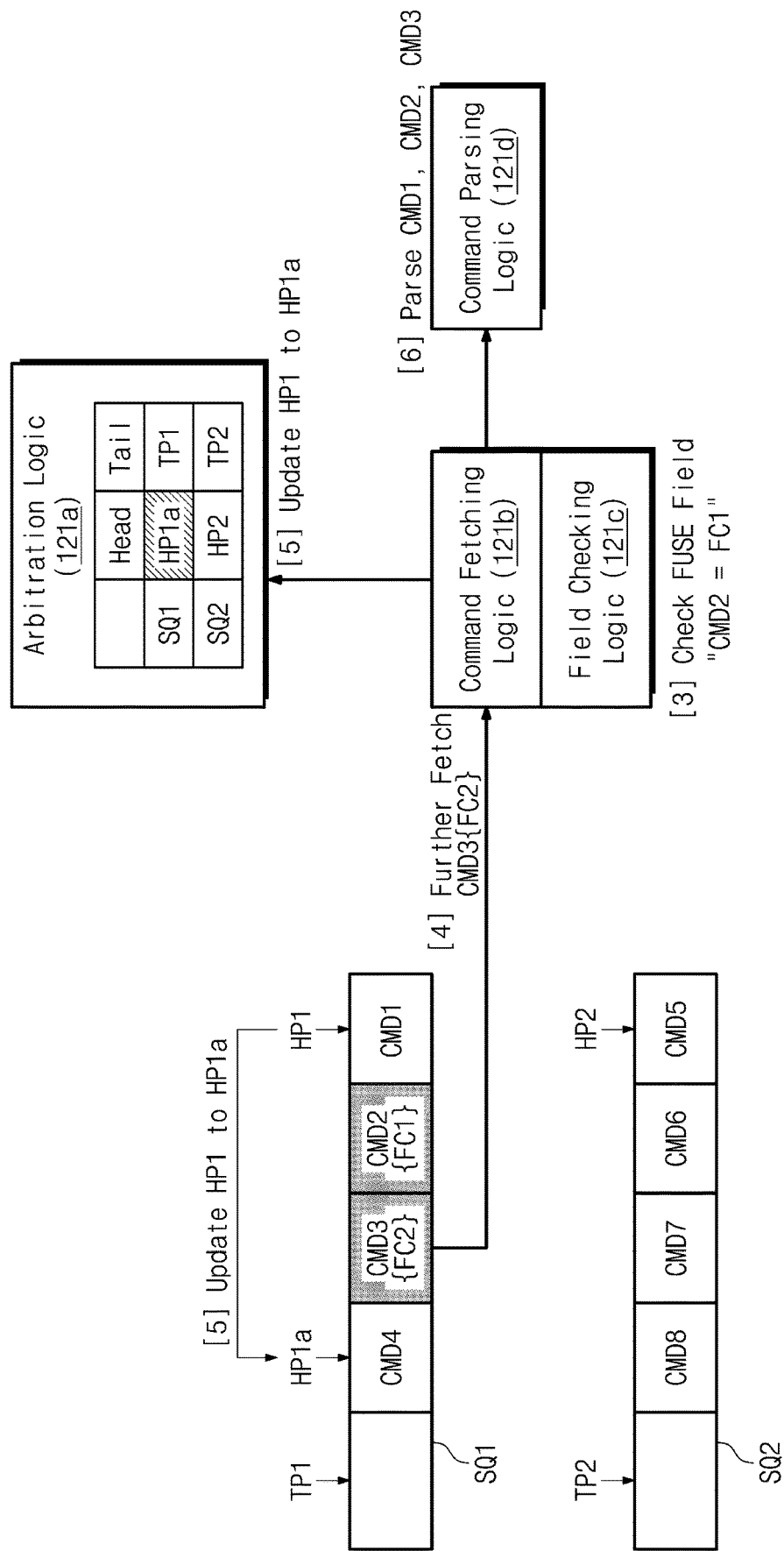
FIG. 7 is a diagram for describing an operation according to the flowchart of FIG. 6 according to example embodiments.

FIG. 7 is a diagram for describing an operation according to the flowchart of FIG. 6 according to example embodiments. In an embodiment, it is assumed that operations of the storage controller 121, that is, operation [1] and operation [2] described with reference to FIG. 5A are completed. For example, it is assumed that there is a state where the storage controller 121 fetches the first and second commands CMD1 and CMD2 from the first submission queue SQ1.

Referring to FIGS. 6 and 7, the field checking logic 121c may check the specific field (e.g., the FUSE field) of the last command, that is, the second command CMD2 (operation [3] of FIG. 7). For example, the field checking logic 121c may check the FUSE field of the second command CMD2 to determine that the second command CMD2 is the first fused command FC1.

In this case, the command fetching logic 121b may further fetch the third command CMD3 from the first submission queue SQ1 (operation [4] of FIG. 7). For example, the first and second fused commands FC1 and FC2 for the fused operation are continuously written in the same submission queue. For example, when the last command among the commands fetched from the first submission queue SQ1 is the first fused command FC1, the second fused command FC2 may be the first command among commands not yet fetched. Accordingly, when the last command is the first fused command FC1, the command fetching logic 121b may further fetch a command (i.e., FC2) from the first submission queue SQ1, and thus, the first and second fused commands FC1 and FC2 may be continuously fetched. As the first and second fused commands FC1 and FC2 are continuously fetched, the fused operation may be performed normally.

Afterwards, the command fetching logic 121b may update the head pointer of the first submission queue SQ1 so as to be changed from HP1 to HP1a (operation [5] of FIG. 7). For example, the command fetching logic 121b may be configured to fetch commands from a selected submission queue two by two under control of the arbitration logic 121a. In contrast, in the embodiment of FIG. 7, after the command fetching logic 121b fetches two commands CMD1 and CMD2 from the first submission queue SQ1, when the last command is the first fused command FC1, the command fetching logic 121b may further fetch the third command CMD3 (i.e., the second fused command FC2) from the first submission queue SQ1.

For example, in the embodiment of FIG. 7, the command fetching logic 121b may fetch a total of three commands from the first submission queue SQ1. Accordingly, the command fetching logic 121b may update the head pointer of the first submission queue SQ1 so as to move (or increase) as much as "3". Afterwards, when a command is fetched from the first submission queue SQ1, the command fetching logic 121b may start the fetch operation from the fourth command CMD4 pointed out by the head pointer of HP1a.

Afterwards, the command fetching logic 121b may provide the first to third commands CMD1, CMD2, and CMD3 to the command parsing logic 121d. The command parsing logic 121d may parse and process the first to third commands CMD1, CMD2, and CMD3. In an embodiment, the second and third commands CMD2 and CMD3 may be the first and second fused commands FC1 and FC2. In this case, the second and third commands CMD2 and CMD3 may be continuously processed in operation [6] of FIG. 7. That is, the fused operation may be normally performed by the first and second fused commands FC1 and FC2.

Figure 8:
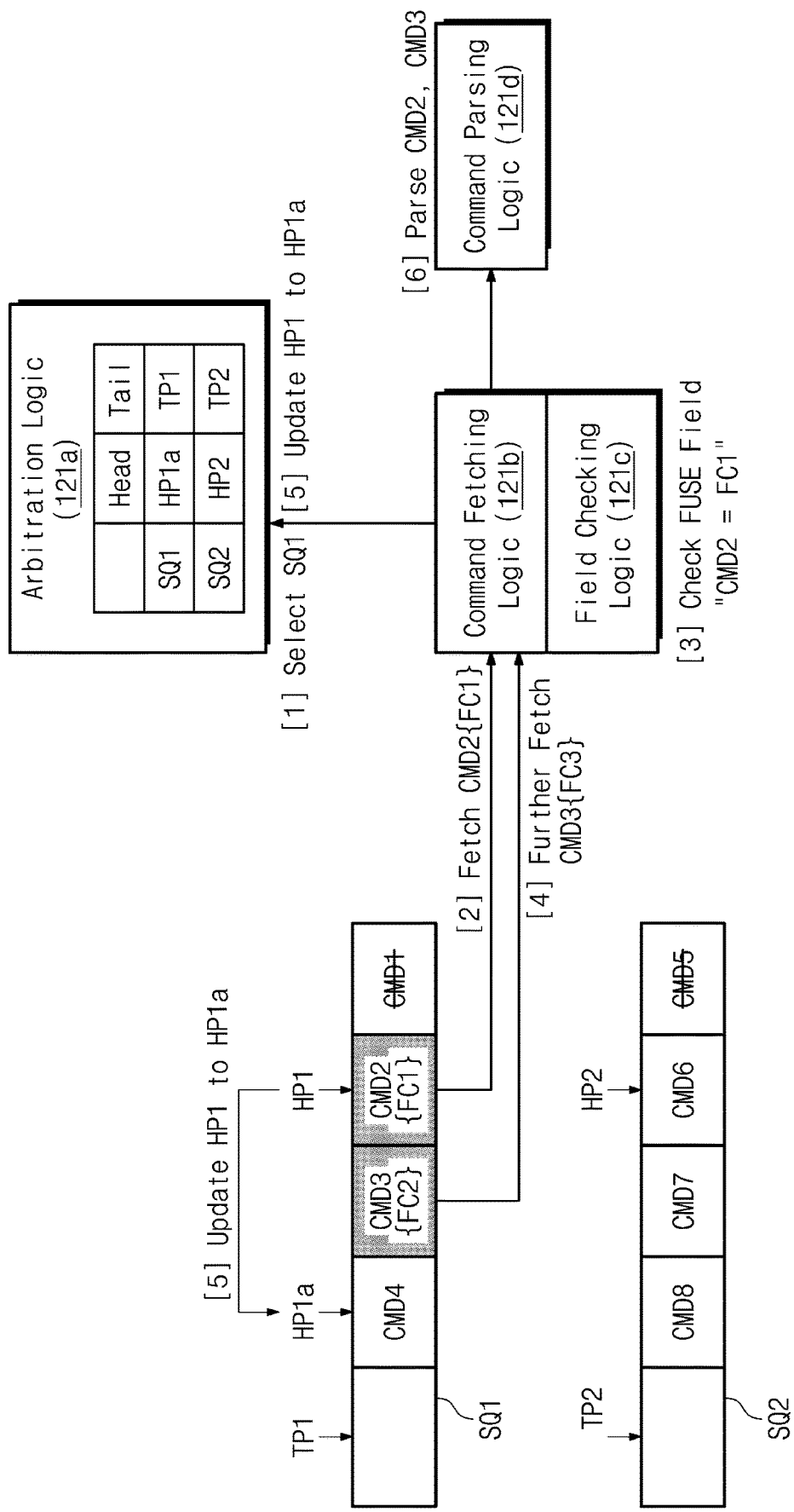
FIG. 8 is a diagram for describing an operation according to the flowchart of FIG. 6 according to example embodiments.

FIG. 8 is a diagram for describing an operation according to the flowchart of FIG. 6 according to example embodiments. In an embodiment, the embodiment in which the command fetching logic 121b fetches commands from a selected submission queue two by two is described with reference to FIG. 7. However, the present disclosure is not limited thereto. For example, in the embodiment of FIG. 8, the command fetching logic 121*b* may fetch a command from the selected submission queue one by one.

For example, the command fetching logic 121*b* may fetch the first command CMD1 from the first submission queue SQ1. Afterwards, the command fetching logic 121*b* may fetch the fifth command CMD5 from the second submission queue SQ2. As one command is fetched from each submission queue, the command fetching logic 121*b* may update the head pointer corresponding to each submission queue such that the head pointer moves (or increases) as much as "1".

Afterwards, the arbitration logic 121*a* may select the first submission queue SQ1 (operation [1] of FIG. 8). The command fetching logic 121*b* may fetch the second command CMD2 from the first submission queue SQ1 under control of the arbitration logic 121*a* (operation [2] of FIG. 8).

The field checking logic 121*c* may determine whether the second command CMD2 is the first fused command FC1, by checking the specific field (e.g., FUSE field) of the second command CMD2 (operation [3] of FIG. 8).

In the embodiment of FIG. 8, the second command CMD2 may be the first fused command FC1. In this case, the command fetching logic 121*b* may further fetch the third command CMD3 from the first submission queue SQ1 (operation [4] of FIG. 8). The command fetching logic 121*b* may update the head pointer of the first submission queue SQ1 so as to be changed from HP1 to HP1a (operation [5] of FIG. 8). For example, as described above, as one command is fetched from each submission queue, the command fetching logic 121*b* may update the head pointer corresponding to each submission queue such that the head pointer moves (or increases) as much as "1". In contrast, in the embodiment of FIG. 8, the command fetching logic 121*b* may further fetch the third command CMD3. In this case, the command fetching logic 121*b* may update the head pointer of the first submission queue SQ1 so as to move (or increase) as much as "2", that is, so as to be changed from HP1 to HP1a.

Afterwards, the command fetching logic 121*b* may provide the second and third commands CMD2 and CMD3 to the command parsing logic 121*d*. The command parsing logic 121*d* may parse and process the second and third commands CMD2 and CMD3 (operation [6] of FIG. 8). In an embodiment, the second and third commands CMD2 and CMD3 may be the first and second fused commands FC1 and FC2, respectively, and thus, may be processed continuously. Accordingly, the fused operation corresponding to the first and second fused commands FC1 and FC2 may be performed normally.

In an embodiment, as described above, when the last command among N commands fetched through one fetch operation is the first fused command, a command additionally fetched from the same submission queue may be the second fused command. Accordingly, an operation in which the first and second fused commands for one fused operation are continuously fetched may be guaranteed.

As described above, when the last command among commands fetched through one fetch operation is the first fused command, the storage device 120 or the storage controller 121 may further fetch a command from the same submission queue. In this case, because a plurality of fused commands for one fused operation are continuously fetched, an additional buffer for temporarily storing a fused command may not be required, or the complexity of hardware for command scheduling may decrease.

In the above embodiments, the description is given as the number of fused commands for one fused operation is 2, but the present disclosure is not limited thereto. For example, the number of fused commands for one fused operation may be "M" (M being a natural number more than 1). In this case, the field checking logic 121*c* may determine whether the last command among fetched commands corresponds to any command among fused commands, and the command fetching logic 121*b* may further fetch a fused command(s), which is not yet fetched, from the same submission queue.

Figure 9:
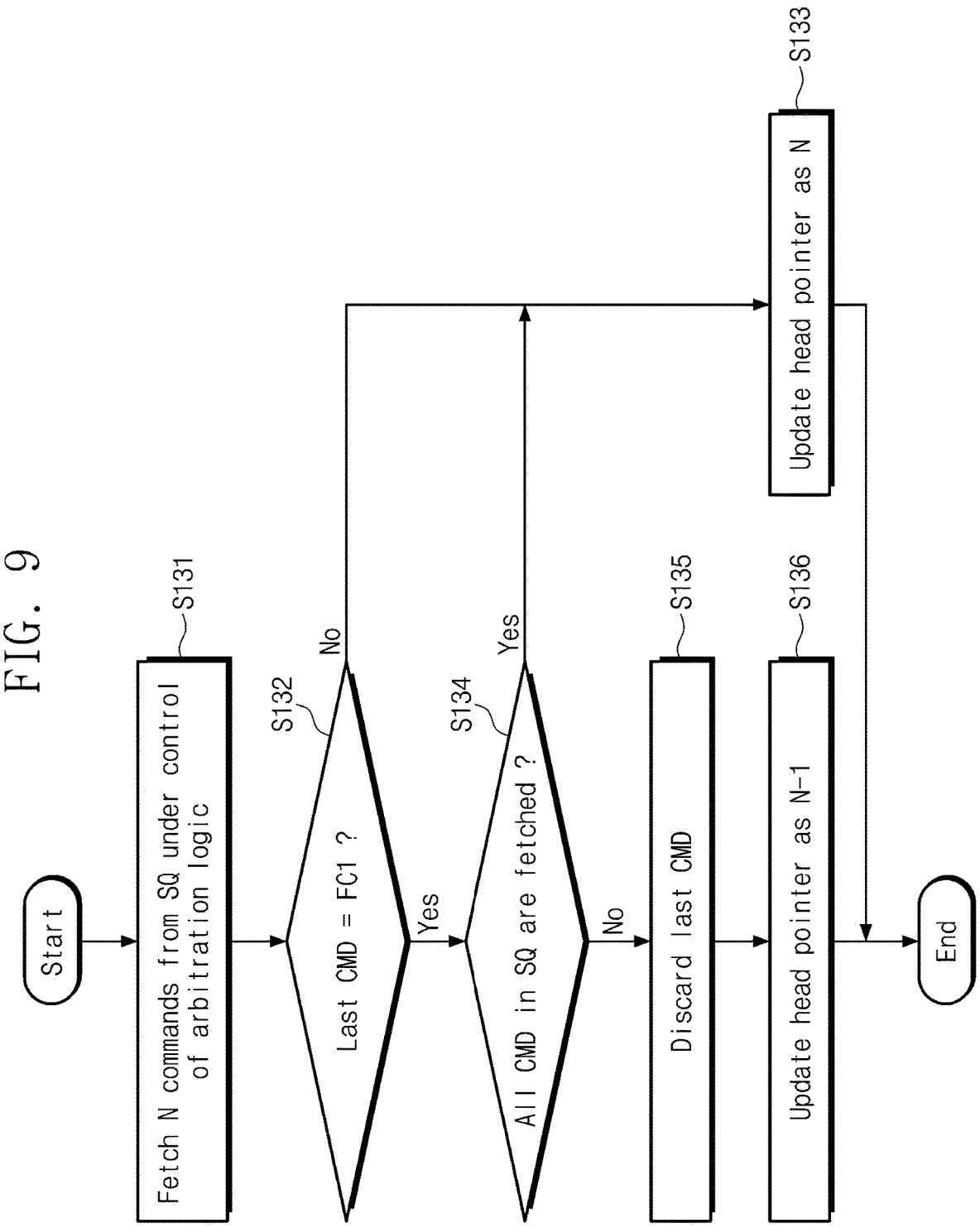
FIG. 9 is a flowchart illustrating an operation of a storage controller of FIG. 1 according to example embodiments.

FIG. 9 is a flowchart illustrating an operation of a storage controller of FIG. 1 according to example embodiments. Referring to FIGS. 1, 3, and 9, in operation S131, the storage controller 121 may fetch N commands from the submission queue SQ under control of the arbitration logic 121*a*. In operation S132, the storage controller 121 may determine whether the last command is the first fused command FC1. When the last command is not the first fused command FC1, in operation S133, the storage controller 121 may update the head pointer so as to move (or increase) as much as "N". Operation S131, operation S132, and operation S133 are similar to operation S111, operation S112, and operation S113 of FIG. 4, and thus, additional description will be omitted to avoid redundancy.

When the last command is the first fused command FC1, in operation S134, the storage controller 121 may determine whether all commands of the submission queue SQ are fetched. For example, the storage controller 121 may determine whether all commands of a relevant submission queue are fetched (or whether a relevant submission queue is empty due to command fetching or whether there is no command pending), based on a head pointer and a tail pointer of and the number of commands fetched from the relevant submission queue.

When all the commands of the submission queue are not fetched (or when a command not fetched is present in the submission queue or when a pending command is present in the submission queue), the storage controller 121 may perform operation S135 and operation S136. Operation S135 and operation S136 of FIG. 9 are similar to operation S114 and operation S115 of FIG. 4, and thus, additional description will be omitted to avoid redundancy.

When all the commands of the submission queue are fetched (or when the submission queue is empty due to command fetching), the storage controller 121 may perform operation S133. In an embodiment, when the last command among the fetched commands is the first fused command FC1 and all the commands of the relevant submission queue are fetched (i.e., when the relevant submission queue is empty), the storage controller 121 may report an error to the host 110 with regard to the first fused command. For example, as described above, the first and second fused commands for the fused operation should be processed continuously. To this end, the host 110 continuously writes the first and second fused commands in the same submission queue. However, in the case where the submission queue is empty after the first fused command FC1 is fetched from the submission queue, because the above operation condition is not satisfied, the storage controller 121 may report an error to the host 110.

In an embodiment, when the last command among the fetched commands is the first fused command FC1 and all the commands of the relevant submission queue are fetched (i.e., when the relevant submission queue is empty), the storage controller 121 may not discard the first fused command FC1. For example, the storage controller 121 may update the head pointer corresponding to the relevant submission queue such that the head pointer points out a position following the first fused command FC1. In this case, the head pointer may point out the same position as the tail pointer of the relevant submission queue (i.e., the relevant submission queue being empty).

Figure 10:
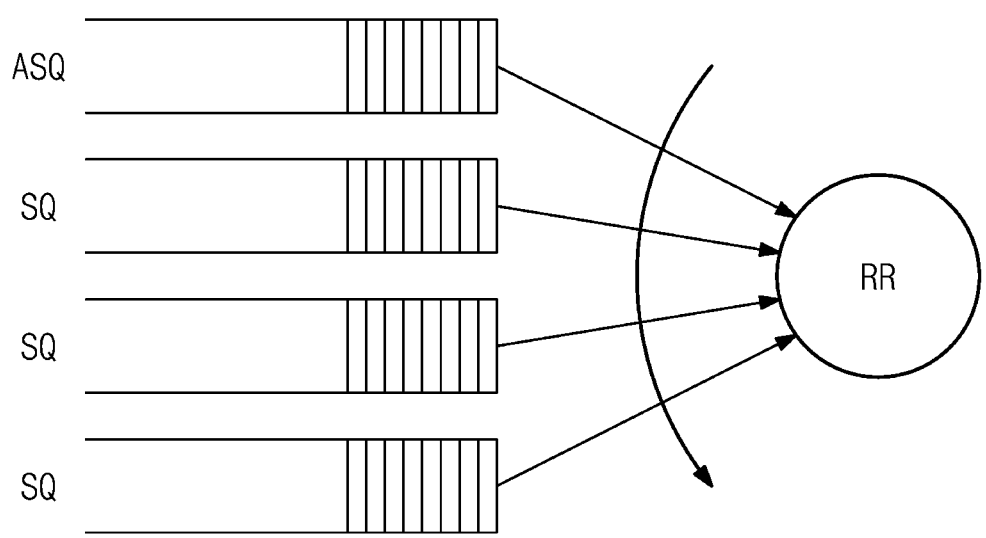
FIGS. 10 and 11 are diagrams for describing an operation of an arbitration circuit of FIG. 3 according to example embodiments.
Figure 11:
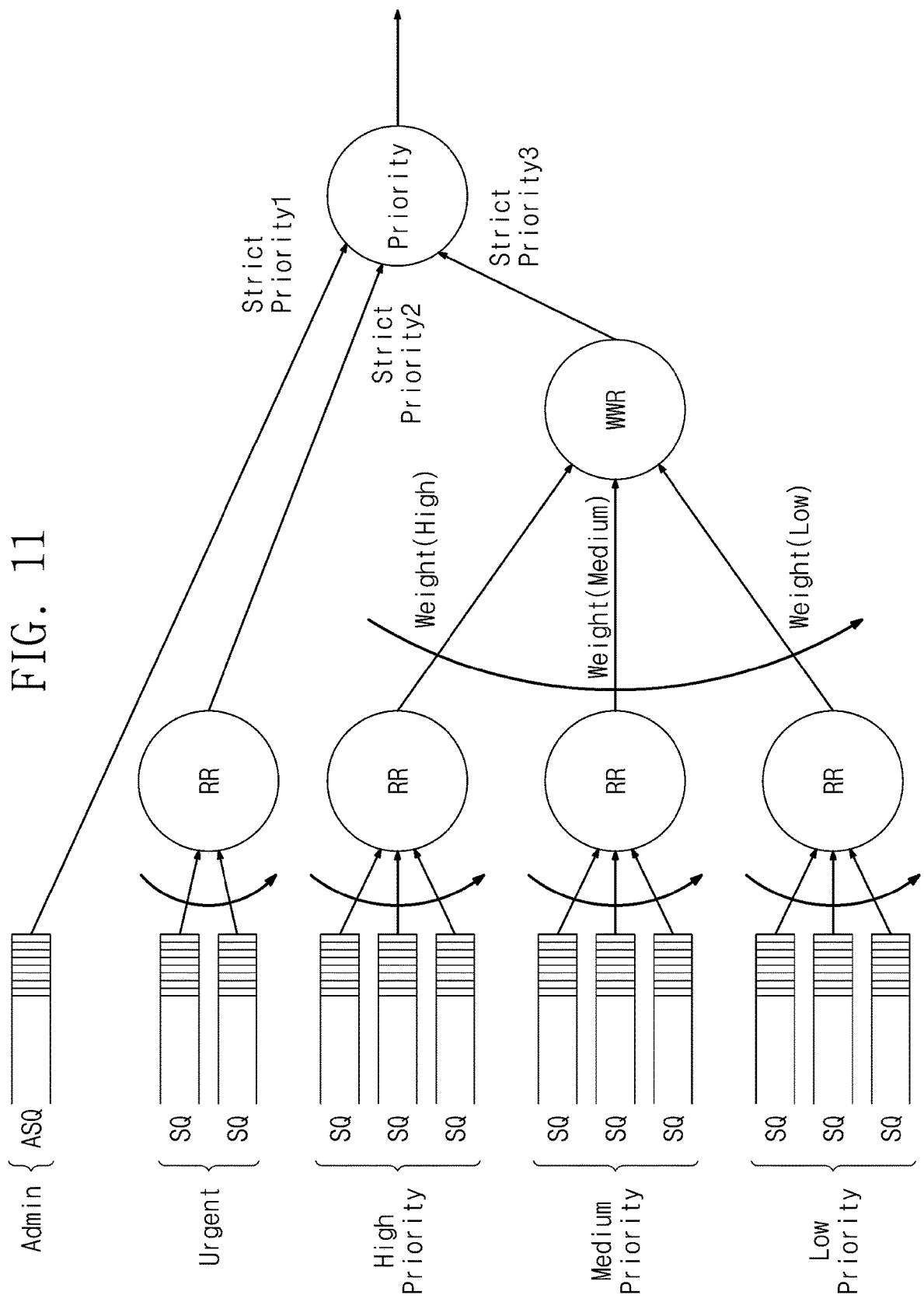

FIGS. 10 and 11 are diagrams for describing an operation of an arbitration circuit of FIG. 3 according to example embodiments. In an embodiment, the arbitration logic 121a of FIG. 3 may select a submission queue, from which a command(s) are to be fetched, from among the plurality of submission queues SQ1, SQ2, and SQ3 of the host 110, based on various manners or policies.

First, referring to FIGS. 3 and 10, the arbitration logic 121a may select a submission queue from which a command (s) are to be fetched, based on the round-robin. For example, the host 110 may include a plurality of submission queues ASQ and SQ. Some (e.g., ASQ) of the plurality of submission queues ASQ and SQ may be used as an admin submission queue for a management operation associated with the storage device 120. The others (e.g., SQ) of the plurality of submission queues ASQ and SQ may be used as an IO submission queue for an input/output operation associated with the storage device 120.

The arbitration logic 121a may sequentially select the plurality of submission queues ASQ and SQ one by one, based on the round-robin. The command fetching logic 121b may be configured to fetch commands from the selected submission queue as much as a given number. In an embodiment, the number of commands fetched from the selected submission queue may be controlled by the arbitration logic 121a.

Next, referring to FIGS. 3 and 11, the arbitration logic 121a may select a submission queue from which a command (s) are to be fetched, based on the weighted round-robin (WRR). For example, some of the plurality of submission queues ASQ and SQ may be used as the admin submission queue ASQ. The others of the plurality of submission queues ASQ and SQ may be used as the input/output submission queue SQ. Each of the input/output submission queues SQ may have "urgent", "high priority", "medium priority", or "low priority", depending on a characteristic thereof. In an embodiment, the attribute or priority of the submission queue may be determined or set by the process of creating a submission queue (e.g., creation I/O submission queue) or the process of creating a completion queue corresponding to a submission queue (e.g., creation I/O completion queue). That is, the attribute or priority of the submission queue may be determined or managed by the host 110.

In an embodiment, the admin submission queue ASQ may correspond to a first strict priority "Strict Priority 1", the submission queues SQ with an urgent characteristic may correspond to a second strict priority "Strict Priority 2", and the remaining submission queues SQ may correspond to a third strict priority "Strict Priority 3". The arbitration logic 121a may first process the submission queue (i.e., ASQ) corresponding to the first strict priority "Strict Priority 1", may then process the submission queue corresponding to the second strict priority "Strict Priority 2", and may then process the submission queues corresponding to the third strict priority "Strict Priority 3".

With regard to the remaining submission queues SQ corresponding to the third strict priority "Strict Priority 3", the arbitration logic 121a may select a submission queue based on the round-robin arbitration between submission queues corresponding to each attribute or priority and may apply a weight (i.e., Weight(High), Weight(Medium), or Weight(Low)) to a priority corresponding to the selected submission queues. The arbitration logic 121a may select a submission queue having a high value from among submission queues to which the weight is applied.

As described above, with regard to the plurality of submission queues, the arbitration logic 121a may select a submission queue from which a command is to be fetched, based on the round-robin arbitration or the weighted round-robin arbitration. However, the present disclosure is not limited thereto. For example, the arbitration logic 121a may select a submission queue from which a command is to be fetched, based on various other manners or algorithms.

Figure 12:
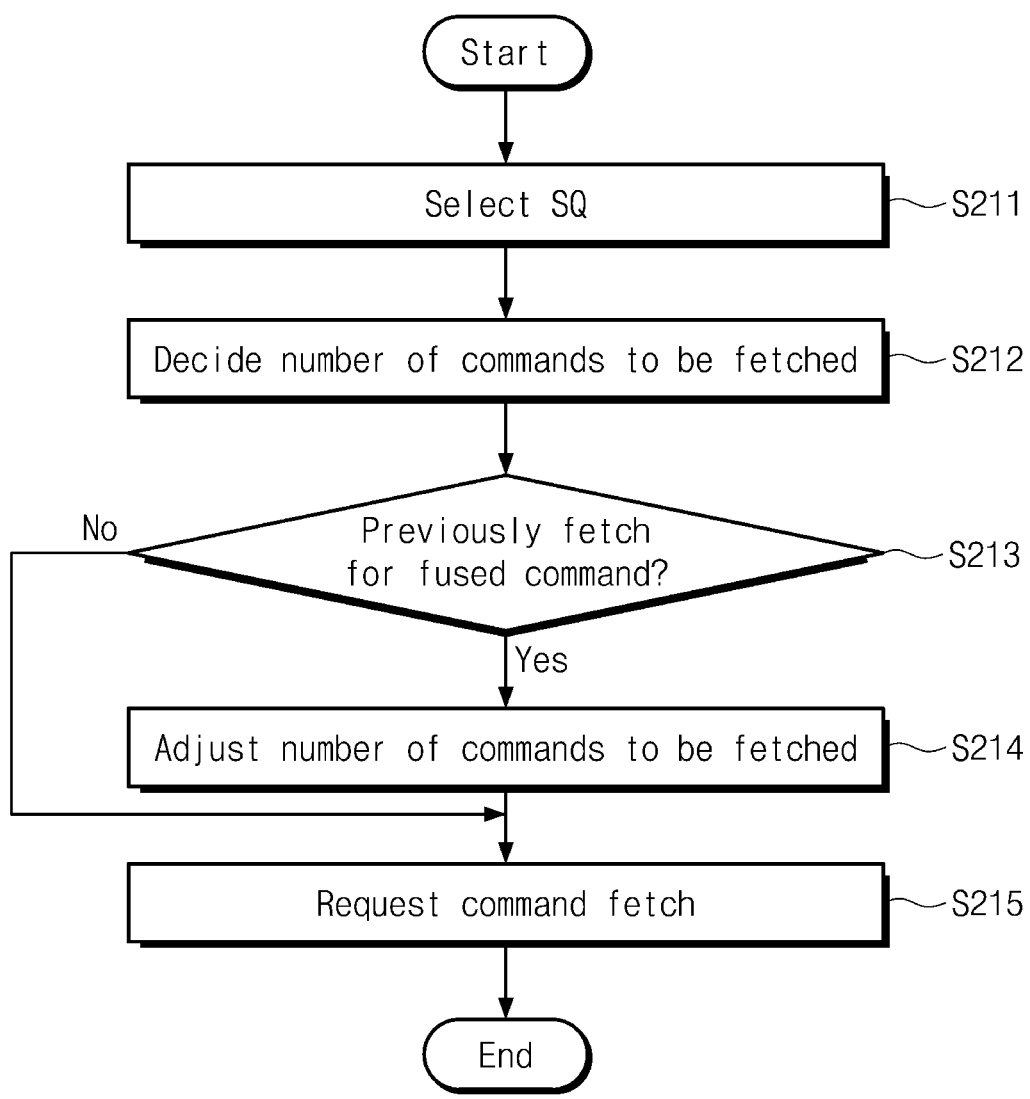
FIG. 12 is a flowchart illustrating an operation of an arbitration circuit of FIG. 3 according to example embodiments.

FIG. 12 is a flowchart illustrating an operation of an arbitration circuit of FIG. 3 according to example embodiments. FIG. 13 is a diagram for describing an operation according to the flowchart of FIG. 12 according to example embodiments. In an embodiment, in the embodiments described with reference to FIGS. 1 to 4, 5A to 5F, and 6 to 9, the arbitration logic 121a is configured to select a submission queue from which a command is to be fetched, based on various arbitration policies. However, the present disclosure is not limited thereto. For example, the arbitration logic 121a may be configured to control, adjust, or manage the number of commands to be fetched from the selected submission queue.

For example, referring to FIGS. 1, 3, 12, and 13, in operation S211, the arbitration logic 121a may select a submission queue. For example, the arbitration logic 121a may select a submission queue, from which a command is to be fetched, from among the plurality of submission queues SQ1 to SQ3 of the host 110. In an embodiment, the arbitration logic 121a may select a submission queue, from which a command is to be fetched, based on the round-robin described with reference to FIG. 10, the weighted round-robin described with reference to FIG. 11, or an arbitration manner based on various other algorithms.

In operation S212, the arbitration logic 121a may decide the number of commands to be fetched from the selected submission queue. For example, the arbitration logic 121a may decide the number of commands to be fetched from the selected submission queue, based on the number of commands pending in each of the plurality of submission queues SQ1 to SQ3. As an example, when the number of commands pending in a selected submission queue is more than the number of commands pending in the remaining submission queues, the arbitration logic 121a may increase the number of commands to be fetched. Alternatively, the number of commands to be fetched may be decided based on importance or urgency of the selected submission queue.

In an embodiment, operation S211 and operation S212 may be performed by the arbitration logic 121a based on a given algorithm, an arbitration policy, or an internal policy.

In operation S213, the arbitration logic 121a may determine whether a fused command of the selected submission queue is previously fetched. For example, as described with reference to FIGS. 1 to 4, 5A to 5F, and 6 to 9, when the last command among commands fetched in the previous fetch operation associated with the selected submission queue is the first fused command FC1, the command fetching logic 121b may discard the last command or may further fetch the second fused command. In this case, the command fetching logic 121b may update FUSE information indicating that the fetch operation is previously performed on the fused command during the command fetch operation associated with the selected submission queue.

For example, the arbitration logic 121a may include the pointer information PTI. The pointer information PTI may include head pointers HP1 to HPn, tail pointers TP1 to TPn, and FUSE information FI with regard to a plurality of submission queues SQ1 to SQn.

For example, as described with reference to FIGS. 1 to 4, 5A to 5F, and 6 to 9, when the fetch operation (e.g., the discarding of the first fused command or the additional fetching of the second fused command) is previously performed on the fused command during the previous command fetch operation associated with the first submission queue SQ1, the FUSE information corresponding to the first submission queue SQ1 may be set to "V".

The arbitration logic 121a may determine whether the fetch operation is performed on the fused command in the previous fetch operation associated with the submission queue SQ, based on the FUSE information.

When it is determined that the fetch operation is not performed on the fused command in the previous fetch operation associated with the submission queue SQ, in operation S215, the arbitration logic 121a may request the command fetching logic 121b to fetch a command.

When it is determined that the fetch operation is performed on the fused command in the previous fetch operation associated with the submission queue SQ, in operation S214, the arbitration logic 121a may adjust the number of commands to be fetched. For example, in the previous fetch operation associated with the first submission queue SQ1, the command fetching logic 121b may discard the fetched last command (i.e., the first fused command FC1). In this case, the arbitration logic 121a may increase the number of to-be-fetched commands as much as "1" such that the first fused command FC1 that is previously fetched and is then discarded is together fetched in the current command fetch operation associated with the first submission queue SQ1.

Alternatively, in the previous fetch operation associated with the first submission queue SQ1, the command fetching logic 121b may further fetch the second fused command FC2. In this case, the arbitration logic 121a may decrease the number of to-be-fetched commands as much as "1" such that commands other than the second fused command FC2 previously fetched are fetched in the current command fetch operation associated with the first submission queue SQ1. As such, even though a fused command is previously additionally fetched or is discarded, the total number of fetched commands may be maintained. Afterwards, the arbitration logic 121a may perform operation S215.

As described above, the storage controller 121 according to an embodiment of the present disclosure may be configured to fetch fused commands continuously, as described with reference to FIGS. 1 to 4, 5A to 5F, and 6 to 9. In this case, the storage controller 121 may adjust the number of commands to be fetched by one fetch operation, depending on whether a fused command is fetched.

Figure 14:
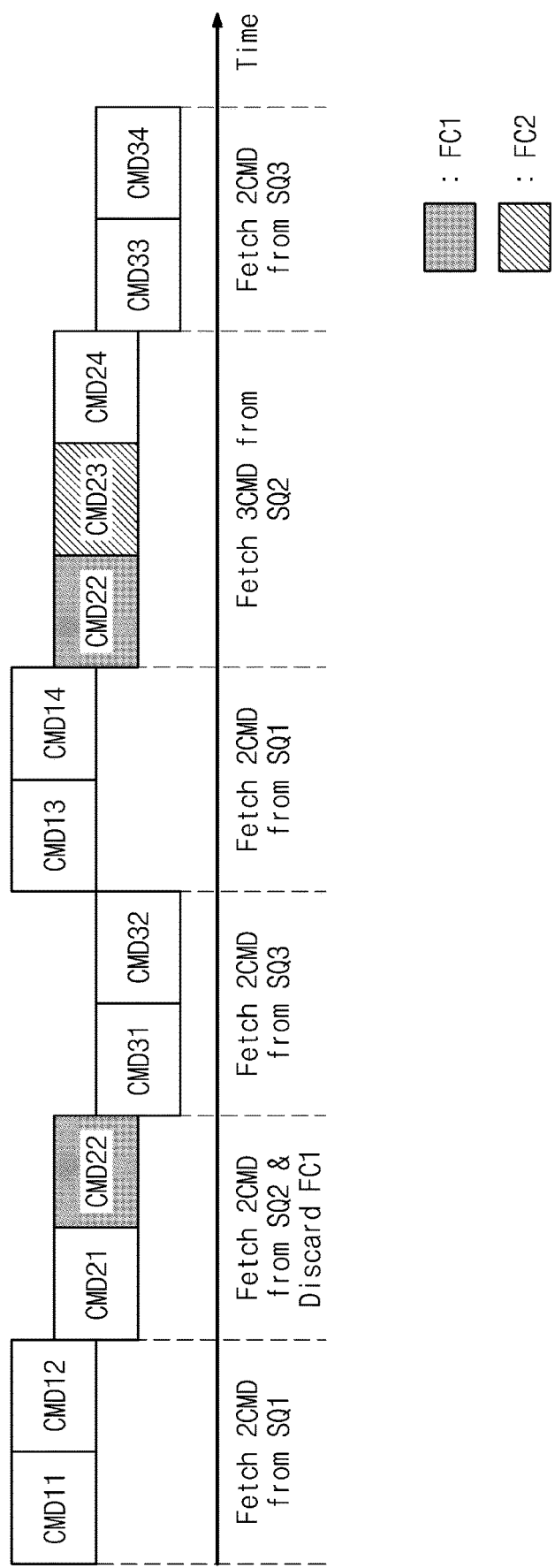
FIGS. 14 and 15 are diagrams for describing an operation according to the flowchart of FIG. 12 according to example embodiments.
Figure 15:
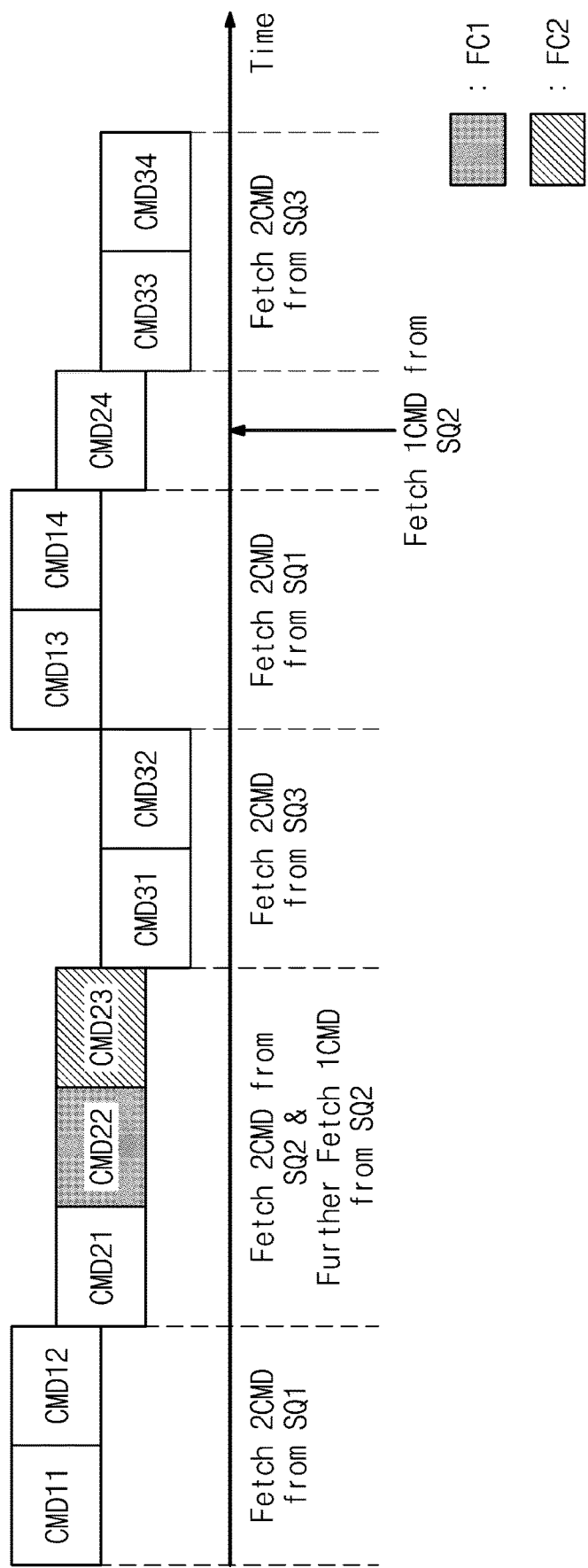

FIGS. 14 and 15 are diagrams for describing an operation according to the flowchart of FIG. 12 according to example embodiments. For convenience of description, it is assumed that the host 110 includes three submission queues SQ1, SQ2, and SQ3, and the three submission queues SQ1, SQ2, and SQ3 include a plurality of commands CMD11 to CMD14, CMD21 to CMD24, and CMD31 to CMD34. Also, it is assumed that the storage controller 121 fetches two commands from each of the first to third submission queues SQ1, SQ2, and SQ3 through one fetch operation. However, the present disclosure is not limited thereto.

As illustrated in FIG. 14, the storage controller 121 may fetch two commands (e.g., CMD11 and CMD12) from the first submission queue SQ1 through one fetch operation. Afterwards, the storage controller 121 may fetch two commands (e.g., CMD21 and CMD22) from the second submission queue SQ2 through one fetch operation. In this case, CMD22 may be the first fused command FC1, and the storage controller 121 may discard CMD22 as described with reference to FIG. 4. In an embodiment, the storage controller 121 may set the FUSE information FI corresponding to the second submission queue SQ2 in response to that the first fused command FC1 (i.e., CMD22) fetched from the second submission queue SQ2 is discarded. Next, the storage controller 121 may fetch two commands (e.g., CMD31 and CMD32) from the third submission queue SQ3 through one fetch operation.

Afterwards, the storage controller 121 may fetch two commands CMD13 and CMD14 from the first submission queue SQ1 through one fetch operation. Afterwards, the storage controller 121 may perform the command fetch operation on the second submission queue SQ2. In this case, the storage controller 121 may check that the fetch operation is previously performed on the fused command in the previous fetch operation associated with the second submission queue SQ2, based on the FUSE information FI about the second submission queue SQ2 (i.e., the first fused command FC1 (CMD22) being discarded). As such, the storage controller 121 may adjust the number of commands to be fetched from the second submission queue SQ2 to "3" and may fetch three commands CMD22, CMD23, and CMD24 from the second submission queue SQ2. In this case, as CMD22 and CMD23 being the first and second fused commands are continuously fetched, the fused operation may be performed normally. Afterwards, the storage controller 121 may fetch two commands CMD33 and CMD34 from the third submission queue SQ3 through one fetch operation.

Next, as illustrated in FIG. 15, the storage controller 121 may fetch two commands (e.g., CMD11 and CMD12) from the first submission queue SQ1 through one fetch operation. Afterwards, the storage controller 121 may fetch two commands (e.g., CMD21 and CMD22) from the second submission queue SQ2 through one fetch operation. In this case, CMD22 may be the first fused command FC1, and the storage controller 121 may further fetch CMD23 being the second fused command FC2 from the second submission queue SQ2 as described with reference to FIG. 6. In this case, as CMD22 and CMD23 being the first and second fused commands are continuously fetched, the fused operation may be performed normally. In an embodiment, the storage controller 121 may set the FUSE information FI corresponding to the second submission queue SQ2 in response to that the second fused command FC2 (i.e., CMD23) is further fetched from the second submission queue SQ2.

Afterwards, the storage controller 121 may fetch two commands CMD13 and CMD14 from the first submission queue SQ1 through one fetch operation. Afterwards, the storage controller 121 may perform the command fetch operation on the second submission queue SQ2. In this case, the storage controller 121 may check that the fetch operation is previously performed on the fused command in the previous fetch operation associated with the second submission queue SQ2, based on the FUSE information FI about the second submission queue SQ2 (i.e., the second fused command FC2 (CMD23) being further fetched). As such, the storage controller 121 may adjust the number of commands to be fetched from the second submission queue SQ2 to "1" and may fetch one command CMD24 from the second submission queue SQ2. Afterwards, the storage controller 121 may fetch two commands CMD33 and CMD34 from the third submission queue SQ3 through one fetch operation.

As described above, according to embodiments of the present disclosure, as the first and second fused commands FC1 and FC2 are continuously fetched, the fused operation may be performed normally. Also, the number of commands to be fetched in a next fetch operation may be adjusted depending on whether a fused command is fetched (i.e., whether the first fused command is discarded or the second fused command is further fetched). According to the above description, as the same number of commands are fetched from each submission queue through the same number of times of the fetch operation, the workload balance for each submission queue may be maintained.

For example, after CMD22 is discarded, when there is no adjustment of the number of commands to be fetched, the storage controller 121 may fetch two commands CMD22 and CMD23 from the second submission queue SQ2. In this case, when the fetch operation is performed two times for each submission queue, four commands may be fetched for each of the first submission queue SQ1 and the third submission queue SQ3, and three commands may be fetched from the second submission queue SQ2. Alternatively, after CMD23 is further fetched, when there is no adjustment of the number of commands to be fetched, the storage controller 121 may fetch two commands CMD24 and CMD25 from the second submission queue SQ2. In this case, when the fetch operation is performed two times for each submission queue, four commands may be fetched for each of the first submission queue SQ1 and the third submission queue SQ3, and five commands may be fetched from the second submission queue SQ2. That is, even though the number of times of the fetch operation is equally maintained, the numbers of commands fetched from submission queues may be different.

In contrast, according to embodiments of the present disclosure, as illustrated in FIG. 14, after CMD22 is discarded, the storage controller 121 may fetch three commands CMD22, CMD23, and CMD24 from the second submission queue SQ2. Alternatively, as illustrated in FIG. 15, after CMD23 is further fetched, the storage controller 121 may fetch one command CMD24 from the second submission queue SQ2. In this case, when the fetch operation is performed two times for each submission queue, four commands may be fetched from each of the first to third submission queues SQ1 to SQ3. For example, through the same number of times of the fetch operation, the numbers of commands fetched from submission queues may be identical. Accordingly, the workload balance for each submission queue may be maintained.

Figure 16:
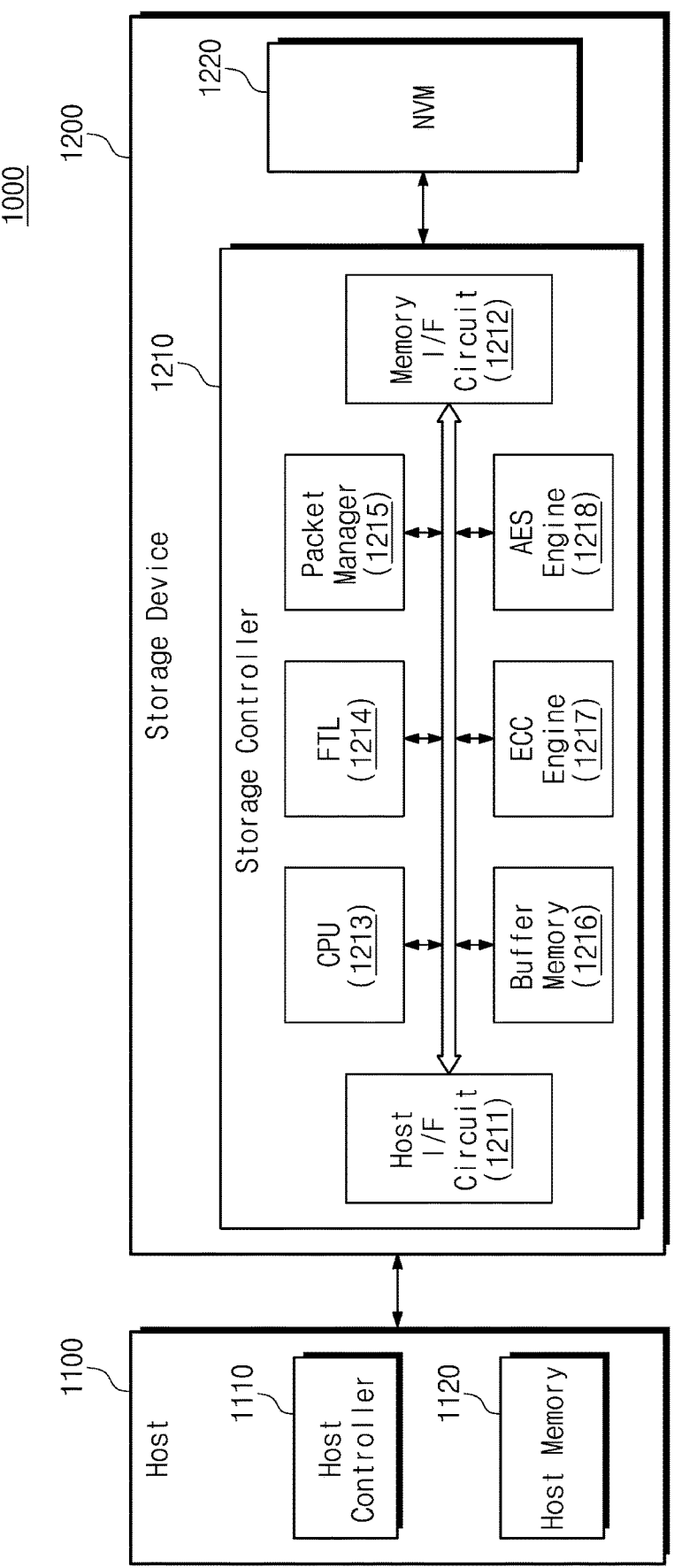
FIG. 16 is a block diagram illustrating a host-storage system according to an embodiment of the present disclosure.

FIG. 16 is a block diagram of a host storage system according to an example embodiment.

The host storage system 1000 may include a host 1100 and a storage device 1200. Further, the storage device 1200 may include a storage controller 1210 and an NVM 1220. According to an example embodiment, the host 1100 may include a host controller 1110 and a host memory 1120. The host memory 1120 may serve as a buffer memory configured to temporarily store data to be transmitted to the storage device 1200 or data received from the storage device 1200.

The storage device 1200 may include storage media configured to store data in response to requests from the host 1100. As an example, the storage device 1200 may include at least one of an SSD, an embedded memory, and a removable external memory. When the storage device 1200 is an SSD, the storage device 200 may be a device that conforms to the NVMe standard. When the storage device 1200 is an embedded memory or an external memory, the storage device 1200 may be a device that conforms to a UFS standard or an eMMC standard. Each of the host 1100 and the storage device 1200 may generate a packet according to an adopted standard protocol and transmit the packet.

When the NVM 1220 of the storage device 1200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 1110 and the host memory 1120 may be implemented as separate semiconductor chips. Alternatively, in some embodiments, the host controller 1110 and the host memory 1120 may be integrated in the same semiconductor chip. As an example, the host controller 1110 may be any one of a plurality of modules included in an application processor (AP). The AP may be implemented as a System on Chip (SoC). Further, the host memory 1120 may be an embedded memory included in the AP or an NVM or memory module located outside the AP.

The host controller 1110 may manage an operation of storing data (e.g., write data) of a buffer region of the host memory 1120 in the NVM 1220 or an operation of storing data (e.g., read data) of the NVM 1220 in the buffer region.

The storage controller 1210 may include a host interface 1211, a memory interface 1212, and a CPU 1213. Further, the storage controllers 1210 may further include a flash translation layer (FTL) 1214, a packet manager 1215, a buffer memory 1216, an error correction code (ECC) engine 1217, and an advanced encryption standard (AES) engine 1218. The storage controllers 1210 may further include a working memory (not shown) in which the FTL 1214 is loaded. The CPU 1213 may execute the FTL 1214 to control data write and read operations on the NVM 1220.

The host interface 1211 may transmit and receive packets to and from the host 1100. A packet transmitted from the host 1100 to the host interface 1211 may include a command or data to be written to the NVM 1220. A packet transmitted from the host interface 1211 to the host 1100 may include a response to the command or data read from the NVM 1220. The memory interface 1212 may transmit data to be written to the NVM 1220 to the NVM 1220 or receive data read from the NVM 1220. The memory interface 1212 may be configured to comply with a standard protocol, such as Toggle or open NAND flash interface (ONFI).

The FTL 1214 may perform various functions, such as an address mapping operation, a wear-leveling operation, and a garbage collection operation. The address mapping operation may be an operation of converting a logical address received from the host 1100 into a physical address used to actually store data in the NVM 1220. The wear-leveling operation may be a technique for preventing excessive deterioration of a specific block by allowing blocks of the NVM 1220 to be uniformly used. As an example, the wear-leveling operation may be implemented using a firmware technique that balances erase counts of physical blocks. The garbage collection operation may be a technique for ensuring usable capacity in the NVM 1220 by erasing an existing block after copying valid data of the existing block to a new block.

The packet manager 1215 may generate a packet according to a protocol of an interface, which consents to the host 1100, or parse various types of information from the packet received from the host 1100. In addition, the buffer memory 1216 may temporarily store data to be written to the NVM 1220 or data to be read from the NVM 1220. Although the buffer memory 1216 may be a component included in the storage controllers 1210, the buffer memory 1216 may be outside the storage controllers 1210.

The ECC engine 1217 may perform error detection and correction operations on read data read from the NVM 1220. More specifically, the ECC engine 1217 may generate parity bits for write data to be written to the NVM 1220, and the generated parity bits may be stored in the NVM 1220 together with write data. During the reading of data from the NVM 1220, the ECC engine 1217 may correct an error in the read data by using the parity bits read from the NVM 1220 along with the read data, and output error-corrected read data.

The AES engine 1218 may perform at least one of an encryption operation and a decryption operation on data input to the storage controllers 1210 by using a symmetric-key algorithm.

In an embodiment, the storage controller 1210 of FIG. 16 may be the storage controller 121 described with reference to FIGS. 1 to 4, 5A to 5F, and 6 to 15 or may be configured to perform the operation method described with reference to FIGS. 1 to 4, 5A to 5F, and 6 to 15. In an embodiment, the arbitration logic 121a, the command fetching logic 121b, the field checking logic 121c, and the command parsing logic 121d described with reference to FIGS. 1 to 4, 5A to 5F, and 6 to 15 may be included in the host interface circuit 1211 of FIG. 16.

Figure 17:
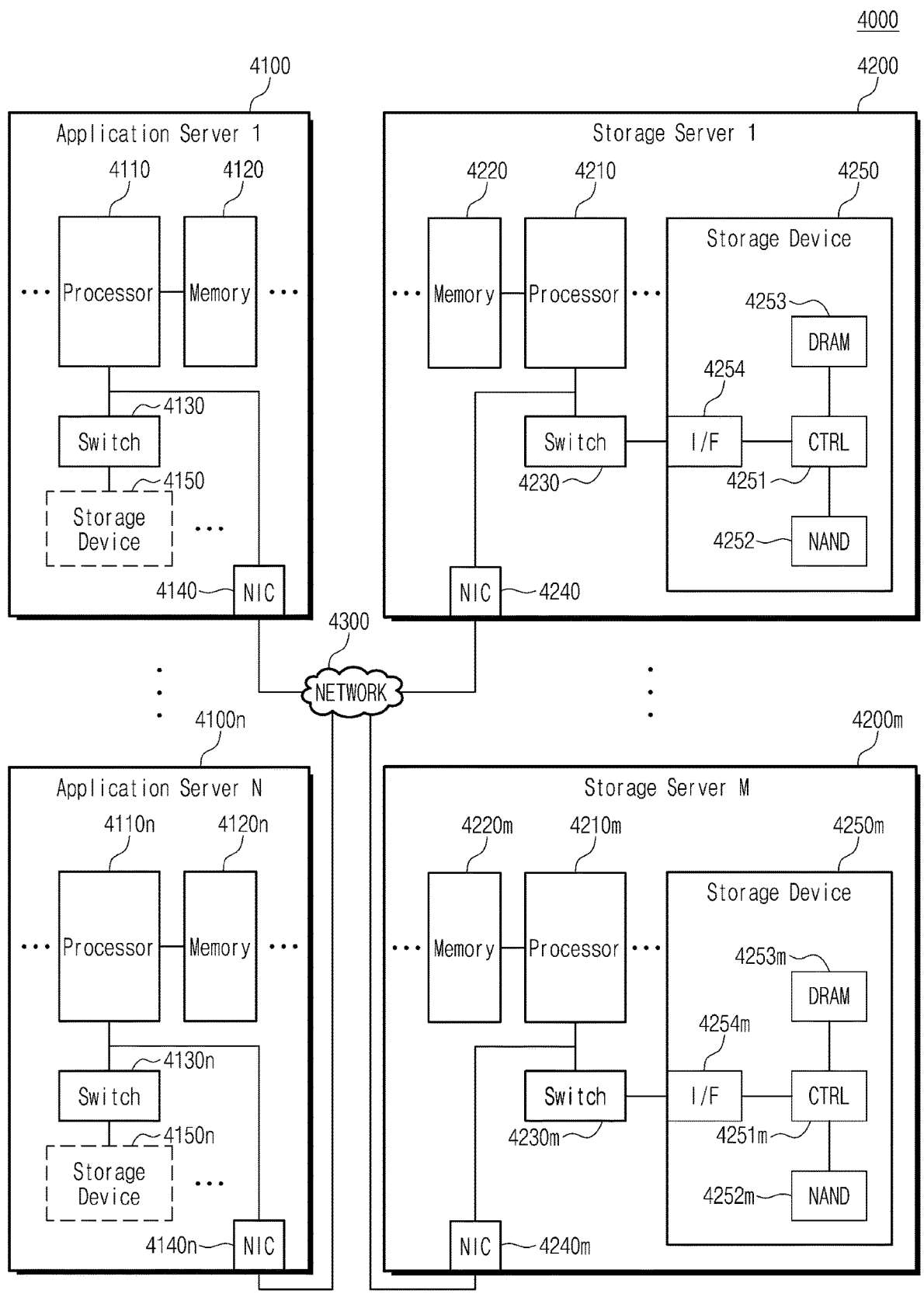
FIG. 17 is a diagram illustrating a data center to which a memory device according to an embodiment of the present disclosure is applied.

FIG. 17 is a diagram of a data center to which a memory device is applied, according to an embodiment.

Referring to FIG. 17, a data center 4000 may be a facility that collects various types of pieces of data and provides services and be referred to as a data storage center. The data center 4000 may be a system for operating a search engine and a database, and may be a computing system used by companies, such as banks, or government agencies. The data center 4000 may include application servers 4100 to 4100n, n being a natural number, and storage servers 4200 to 4200m, m being a natural number. The number of application servers 4100 to 4100n and the number of storage servers 4200 to 4200m may be variously selected according to embodiments. The number of application servers 4100 to 4100n may be different from the number of storage servers 4200 to 4200m.

The application server 4100 or the storage server 4200 may include at least one of processors 4110 and 4210 and memories 4120 and 4220. The storage server 4200 will now be described as an example. The processor 4210 may control all operations of the storage server 4200, access the memory 4220, and execute instructions and/or data loaded in the memory 4220. The memory 4220 may be a double-data-rate synchronous DRAM (DDR SDRAM), a high-bandwidth memory (HBM), a hybrid memory cube (HMC), a dual in-line memory module (DIMM), Optane DIMM, and/or a nonvolatile memory DIMM (NVMDIMM). In some embodiments, the numbers of processors 4210 and memories 4220 included in the storage server 4200 may be variously selected. In an embodiment, the processor 4210 and the memory 4220 may provide a processor-memory pair. In an embodiment, the number of processors 4210 may be different from the number of memories 4220. The processor 4210 may include a single-core processor or a multi-core processor. The above description of the storage server 4200 may be similarly applied to the application server 4100. In some embodiments, the application server 4100 may not include a storage device 4150. The storage server 4200 may include at least one storage device 4250. The number of storage devices 4250 included in the storage server 4200 may be variously selected according to embodiments.

The application servers 4100 to 4100n may communicate with the storage servers 4200 to 4200m through a network 4300. The network 4300 may be implemented by using a fiber channel (FC) or Ethernet. In this case, the FC may be a medium used for relatively high-speed data transmission and use an optical switch with high performance and high availability. The storage servers 4200 to 4200m may be provided as file storages, block storages, or object storages according to an access method of the network 4300.

In an embodiment, the network 4300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 4300 may be a general network, such as a TCP/IP network. For example, the network 4300 may be implemented according to a protocol, such as FC over Ethernet (FCOE), network attached storage (NAS), and NVMe over Fabrics (NVMe-oF).

Hereinafter, the application server 4100 and the storage server 4200 will mainly be described. A description of the application server 4100 may be applied to another application server 4100n, and a description of the storage server 4200 may be applied to another storage server 4200m.

The application server 4100 may store data, which is requested by a user or a client to be stored, in one of the storage servers 4200 to 4200m through the network 4300. Also, the application server 4100 may obtain data, which is requested by the user or the client to be read, from one of the storage servers 4200 to 4200m through the network 4300. For example, the application server 4100 may be implemented as a web server or a database management system (DBMS).

The application server 4100 may access a memory 4120n or a storage device 4150n, which is included in another application server 4100n, through the network 4300. Alternatively, the application server 4100 may access memories 4220 to 4220m or storage devices 4250 to 4250m, which are included in the storage servers 4200 to 4200m, through the network 4300. Thus, the application server 4100 may perform various operations on data stored in application servers 4100 to 4100n and/or the storage servers 4200 to 4200m. For example, the application server 4100 may execute an instruction for moving or copying data between the application servers 4100 to 4100n and/or the storage servers 4200 to 4200m. In this case, the data may be moved from the storage devices 4250 to 4250m of the storage servers 4200 to 4200m to the memories 4120 to 4120n of the application servers 4100 to 4100n directly or through the memories 4220 to 4220m of the storage servers 4200 to 4200m. The data moved through the network 4300 may be data encrypted for security or privacy.

The storage server 4200 will now be described as an example. An interface 4254 may provide physical connection between a processor 4210 and a controller 4251 and a physical connection between a network interface card or a network interface controller (NIC) 4240 and the controller 4251. For example, the interface 4254 may be implemented using a direct attached storage (DAS) scheme in which the storage device 4250 is directly connected with a dedicated cable. For example, the interface 4254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 4200 may further include a switch 4230 and the NIC 4240. The switch 4230 may selectively connect the processor 4210 to the storage device 4250 or selectively connect the NIC 4240 to the storage device 4250 via the control of the processor 4210.

In an embodiment, the NIC 4240 may include a network interface card and a network adaptor. The NIC 4240 may be connected to the network 4300 by a wired interface, a wireless interface, a Bluetooth interface, or an optical interface. The NIC 4240 may include an internal memory, a digital signal processor (DSP), and a host bus interface and be connected to the processor 4210 and/or the switch 4230 through the host bus interface. The host bus interface may be implemented as one of the above-described examples of the interface 4254. In an embodiment, the NIC 4240 may be integrated with at least one of the processor 4210, the switch 4230, and the storage device 4250.

In the storage servers 4200 to 4200m or the application servers 4100 to 4100n, a processor may transmit a command to storage devices 4150 to 4150n and 4250 to 4250m or the memories 4120 to 4120n and 4220 to 4220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 4150 to 4150n and 4250 to 4250m may transmit a control signal and a command/address signal to NAND flash memory devices 4252 to 4252m in response to a read command received from the processor. Thus, when data is read from the NAND flash memory devices 4252 to 4252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 4251 may control all operations of the storage device 4250. In an embodiment, the controller 4251 may include SRAM. The controller 4251 may write data to the NAND flash memory device 4252 in response to a write command or read data from the NAND flash memory device 4252 in response to a read command. For example, the write command and/or the read command may be provided from the processor 4210 of the storage server 4200, the processor 4210m of another storage server 4200m, or the processors 4110 and 4110n of the application servers 4100 and 4100n. DRAM 4253 may temporarily store (or buffer) data to be written to the NAND flash memory device 4252 or data read from the NAND flash memory device 4252. Also, the DRAM 4253 may store metadata. Here, the metadata may be user data or data generated by the controller 4251 to manage the NAND flash memory device 4252. The storage device 4250 may include a secure element (SE) for security or privacy.

In an embodiment, each storage device of the storage devices 4150 to 4150n and 4250 to 4250m included in the application servers 4100 to 4100n and the storage servers 4200 to 4200m may correspond to the storage device 120 of FIG. 1.

In an embodiment, the storage devices 4150 to 4150n and 4250 to 4250m included in the application servers 4100 to 4100n and the storage servers 4200 to 4200m may operate based on the operation method described with reference to FIGS. 1 to 4, 5A to 5F, and 6 to 15.

According to the present disclosure, in a storage device supporting a fused operation, the storage device may fetch a plurality of fused commands for the fused operation from a submission queue of a host at a time, simultaneously, or continuously. Accordingly, the fused operation may be performed normally, and a separate command buffer and command scheduling are not required. That is, an operation method of a storage device having improved performance and reduced costs is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a storage device connected to a host, the method comprising:
fetching a plurality of first commands from a first submission queue of the host by performing a first command fetch operation, the plurality of first commands including a first fused command and not including a second fused command;
when a last command among the plurality of first commands is the first fused command, processing one or more remaining commands of the plurality of first commands other than the last command;
fetching one or more second commands from a second submission queue of the host by performing a second command fetch operation;
processing the one or more second commands; and
fetching at least two third commands from the first submission queue of the host by performing a third command fetch operation,
wherein the at least two third commands include the first fused command and the second fused command corresponding to the first fused command.

2. The method of claim 1, wherein the first fused command is a compare command and the second fused command is a write command.

3. The method of claim 2, further comprising:
performing a fused operation of compare and write by processing the first fused command and the second fused command in an atomic unit.

4. The method of claim 1, wherein the processing of the one or more remaining commands includes:
checking a fused operation (FUSE) field of the last command among the plurality of first commands; and
when the FUSE field of the last command indicates that the last command is the first fused command, discarding the last command.

5. The method of claim 4, wherein the processing of the one or more remaining commands further includes:
when the FUSE field of the last command indicates that the last command is the first fused command, updating a head pointer of the first submission queue such that the head pointer points out the last command.

6. The method of claim 4, wherein the checking of the FUSE field of the last command is performed before the last command is parsed.

7. The method of claim 1, wherein the processing of the one or more remaining commands includes:

when a pending command is absent from the first submission queue of the host, reporting an error associated with the last command to the host.

8. The method of claim 7, wherein the processing of the one or more remaining commands further includes:
when the pending command is absent from the first submission queue of the host, updating a head pointer of the first submission queue such that the head pointer points out a position of a tail pointer of the first submission queue.

9. The method of claim 1,
wherein the number of the plurality of first commands fetched from the first submission queue through the first command fetch operation is "N", wherein N is a natural number, and
wherein the number of the at least two third commands fetched from the first submission queue through the third command fetch operation is (N+1).

10. The method of claim 1, wherein the last command is a command, which is the closest in position to a tail pointer of the first submission queue, from among the plurality of first commands.

11. The method of claim 1,
wherein the fetching of the plurality of first commands from the first submission queue includes:
selecting the first submission queue among a plurality of submission queues of the host, based on an arbitration policy,
wherein the fetching of the one or more second commands from the second submission queue includes:
selecting the second submission queue among the plurality of submission queues of the host, based on the arbitration policy, and
wherein the fetching of the at least two third commands from the first submission queue includes:
selecting the first submission queue among the plurality of submission queues of the host, based on the arbitration policy.

12. The method of claim 11, wherein the arbitration policy is one of a round-robin policy and a weighted round-robin policy for the plurality of submission queues.

13. An operation method of a storage device connected to a host, the method comprising:
fetching N commands (N being a natural number greater than 1) from a first submission queue of the host by performing a first command fetch operation, the N commands including a first fused command and not including a second fused command; and
fetching M commands (M being a natural number) from a second submission queue of the host by performing a second command fetch operation,
wherein the performing of the first command fetch operation includes:
before the performing of the second command fetch operation, when a fused operation (FUSE) field of a last command among the N commands fetched from the first submission queue through the first command fetch operation includes a first value, selectively further fetching a next command from the first submission queue, and wherein the last command and the next command are processed in an atomic unit.

14. The method of claim 13, wherein the last command is a compare command and the next command is a write command.

15. The method of claim 13, further comprising:
after further fetching the next command from the first submission queue, updating a head pointer of the first submission queue such that the head pointer points out a position following the next command in the first submission queue.

16. The method of claim 13, further comprising:
fetching (N−1) commands from the first submission queue of the host by performing a third command fetch operation; and
fetching M commands from the second submission queue of the host by performing a fourth command fetch operation.

17. The method of claim 16, wherein the "N" and the "M" are decided based on an internal arbitration policy of the storage device.

18. An operation method of a storage device which is connected to a host, the method comprising:
performing a fused operation in response to a first fused command and a second fused command written in a first submission queue of the host,
wherein the performing of the fused operation includes:
fetching a plurality of first commands from the first submission queue by performing a first command fetch operation, wherein the plurality of first commands include the first fused command and do not include the second fused command;
processing one or more remaining commands among the plurality of first commands other than the first fused command;
fetching a plurality of second commands from the first submission queue, wherein the plurality of second commands include both the first fused command and the second fused command; and
processing the plurality of second commands,
wherein the first and second fused commands are processed in an atomic unit.

19. The method of claim 18, wherein the processing of the one or more remaining commands includes:
determining whether a last command among the plurality of first commands is the first fused command, based on a fused operation (FUSE) field of the last command; and
when the last command is the first fused command, processing the one or more remaining commands other than the first fused command among the plurality of first commands.

20. The method of claim 18, wherein the processing of the one or more remaining commands includes:
determining whether a last command among the plurality of first commands is the first fused command, based on a fused operation (FUSE) field of the last command; and
when the last command is the first fused command, updating a head pointer of the first submission queue such that the head pointer points out a position of the last command.

* * * * *